(12) United States Patent
Ro et al.

(10) Patent No.: US 9,553,703 B2
(45) Date of Patent: Jan. 24, 2017

(54) METHOD AND APPARATUS FOR TRANSMITTING DOWNLINK HYBRID AUTOMATIC REPEAT REQUEST INFORMATION IN WIRELESS COMMUNICATION SYSTEM

(75) Inventors: Sang-Min Ro, Seoul (KR); Joon-Young Cho, Gyeonggi-do (KR); Youn-Sun Kim, Gyeonggi-do (KR); Hyoung-Ju Ji, Seoul (KR); Ju-Ho Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/237,154

(22) PCT Filed: Aug. 2, 2012

(86) PCT No.: PCT/KR2012/006175
§ 371 (c)(1),
(2), (4) Date: Feb. 4, 2014

(87) PCT Pub. No.: WO2013/019083
PCT Pub. Date: Feb. 7, 2013

(65) Prior Publication Data
US 2014/0161094 A1 Jun. 12, 2014

(30) Foreign Application Priority Data
Aug. 4, 2011 (KR) .................. 10-2011-0077941

(51) Int. Cl.
*H04L 5/00* (2006.01)
*H04L 1/18* (2006.01)
(Continued)

(52) U.S. Cl.
CPC .......... *H04L 5/0037* (2013.01); *H04L 1/1861* (2013.01); *H04L 5/0055* (2013.01); *H04B 7/0634* (2013.01);
(Continued)

(58) Field of Classification Search
CPC .... H04L 5/0037; H04L 5/0055; H04L 1/1861; H04L 5/0016; H04L 5/0023; H04L 5/0048; H04L 1/0026; H04L 1/0027; H04L 1/1812; H04L 2025/03426; H04L 27/2613; H04B 7/0634; H04B 7/065; H04B 7/0862; H04B 7/0859; H04B 7/0656; H04W 72/0406; H04W 28/04; H04W 72/1278
(Continued)

(56) References Cited

U.S. PATENT DOCUMENTS 6,192,256 B1 * 2/2001 Whinnett ............... 455/562.1
8,265,021 B2 9/2012 Nam et al.
(Continued)

FOREIGN PATENT DOCUMENTS

EP 2242193 A1 10/2010
KR 10-2009-0089780 8/2009
(Continued)

OTHER PUBLICATIONS

International Search Report dated Feb. 19, 2013 in connection with International Patent Application No. PCT/KR2012/006175, 3 pages.
(Continued)

*Primary Examiner* — Edan Orgad
*Assistant Examiner* — Ivan O Latorre

(57) ABSTRACT

A method and an apparatus and for transmitting downlink Hybrid Automatic Repeat request (HARQ) information in a wireless communication system are provided. In the method, at least one Physical Resource Block (PRB) for transmitting
(Continued)

a Physical HARQ Indicator Channel (PHICH) signal is set among all PRBs forming an available frequency band. A PHICH resource is determined within the set at least one PRB. A PHICH signal is transmitted using the determined PHICH resource.

20 Claims, 20 Drawing Sheets

(51) Int. Cl.
    *H04B 7/06*            (2006.01)
    *H04B 7/08*            (2006.01)

(52) U.S. Cl.
    CPC .......... *H04B 7/0862* (2013.01); *H04L 5/0016* (2013.01); *H04L 5/0023* (2013.01); *H04L 5/0048* (2013.01)

(58) Field of Classification Search
    USPC ............... 370/208, 252, 328, 329, 330, 278, 335,370/336, 465; 455/522, 63.1, 67.11, 68, 69, 455/138, 450, 454, 550.1; 714/748, 749, 750, 714/751
    See application file for complete search history.

(56) References Cited

U.S. PATENT DOCUMENTS

| | | | |
|---|---|---|---|
| 9,020,517 B2 | 4/2015 | Kim et al. | |
| 2008/0075184 A1* | 3/2008 | Muharemovic et al. | 375/260 |
| 2008/0095109 A1* | 4/2008 | Malladi et al. | 370/330 |
| 2009/0006925 A1* | 1/2009 | Pan | 714/758 |
| 2009/0055703 A1* | 2/2009 | Kim et al. | 714/748 |
| 2009/0097457 A1* | 4/2009 | Papasakellariou et al. | 370/336 |
| 2009/0274037 A1* | 11/2009 | Lee et al. | 370/208 |
| 2010/0098005 A1* | 4/2010 | Lee | H04L 1/1861 370/329 |
| 2010/0172308 A1* | 7/2010 | Nam et al. | 370/329 |
| 2010/0195583 A1* | 8/2010 | Nory et al. | 370/329 |
| 2010/0238824 A1* | 9/2010 | Farajidana et al. | 370/252 |
| 2010/0309808 A1* | 12/2010 | Miki et al. | 370/252 |
| 2010/0332937 A1 | 12/2010 | Dai et al. | |
| 2011/0002309 A1* | 1/2011 | Park | H04L 1/1607 370/335 |
| 2011/0085587 A1* | 4/2011 | Moulsley et al. | 375/219 |
| 2012/0088537 A1* | 4/2012 | Petersson et al. | 455/522 |
| 2012/0170524 A1* | 7/2012 | Ren et al. | 370/329 |
| 2013/0100904 A1 | 4/2013 | Kim et al. | |
| 2014/0086170 A1 | 3/2014 | Miki et al. | |

FOREIGN PATENT DOCUMENTS

| | | |
|---|---|---|
| KR | 10-2010-0056962 | 5/2010 |
| WO | 2008/153367 A1 | 12/2008 |

OTHER PUBLICATIONS

Written Opinion of International Searching Authority dated Feb. 19, 2013 in connection with International Patent Application No. PCT/KR2012/006175, 4 pages.

Extended European Search Report dated Apr. 8, 2015 in connection with European Patent Application No. 12820772.7; 6 pages.

\* cited by examiner

METHOD AND APPARATUS FOR TRANSMITTING DOWNLINK HYBRID AUTOMATIC REPEAT REQUEST INFORMATION IN WIRELESS COMMUNICATION SYSTEM

CROSS-REFERENCE TO RELATED APPLICATION(S)

The present application claims priority under 35 U.S.C. §365 to International Patent Application No. PCT/KR2012/006175 filed Aug. 2, 2012, entitled "METHOD AND APPARATUS FOR TRANSMITTING DOWNLINK HYBRID AUTOMATIC REPEAT REQUEST INFORMATION IN WIRELESS COMMUNICATION SYSTEM". International Patent Application No. PCT/KR2012/006175 claims priority under 35 U.S.C. §365 and/or 35 U.S.C. §119(a) to Korean Patent Application No. 10-2011-0077941 filed Aug. 4, 2011 and which are incorporated herein by reference into the present disclosure as if fully set forth herein.

BACKGROUND OF THE INVENTION

1. Field of the Invention

The present invention relates to a wireless communication system. More particularly, the present invention relates to a technology for transmitting downlink Hybrid Automatic Repeat request (HARQ) information in a wireless communication system supporting an HARQ technique.

2. Description of the Related Art

A wireless communication system applies an HARQ technique as one of technologies for improving data reception performance. As a representative example, a Long Term Evolution (LTE) system which is the next generation mobile communication system of an asynchronous cellular mobile communication standard organization 3$^{rd}$ Generation Partnership Project (3GPP) uses an HARQ technique for downlink and uplink data transmission.

FIG. 1A illustrates an ACK/NACK transmission structure in an LTE system according to a conventional art.

Referring to FIG. 1A, a subframe 100 having a length of 1 ms, which is a basic unit of downlink transmission in an LTE system consists of two slots 101 of 0.5 ms. Assuming a general Cyclic Prefix (CP) length, each slot consists of seven Orthogonal Frequency Division Multiplexing (OFDM) symbols 102. Also, a Physical Resource Block (PRB) 103 consists of 12 subcarriers in the frequency domain, and as a resource allocator corresponding to one slot, the PRB consists of a resource element 104 corresponding to one subcarrier and one OFDM symbol in the time domain. Here, FIG. 1A illustrates an ACK/NACK transmission structure assuming that a base station cell supports two antenna ports and a control region has been set to three OFDM symbol sections. A PRB illustrated to the left illustrates an ACK/NACK transmission structure for a first antenna 105, and a PRB illustrated to the right illustrates an ACK/NACK transmission structure for a second antenna 106.

As described above, a resource region for downlink in an LTE system is roughly divided into a control region and a data region. First, the control region means a communication resource including a Physical Downlink Control Channel (PDCCH) for transmitting control information for each terminal, and a Physical HARQ Indicator Channel (PHICH) for transmitting ACK/NACK information for uplink data. The control region may be freely allocated within a first OFDM symbol section to a third OFDM symbol section.

Next, the data region means a series of communication resources including a data channel (Physical Downlink Shared Channel (PDSCH)) for transmitting data such as voice and a packet transmitted to each terminal. Also, the LIE system allows all terminals inside a cell to estimate a downlink channel by transmitting a Common Reference Signal (CRS) via each of the data region and the control region.

A conventional LTE system allocates a PHICH for transmitting ACK/NACK information for uplink data to the control region, and performs dispersion transmission throughout available frequency band. That is, the conventional LTE system generates an ACK/NACK signal for each terminal as a BPSK symbol, and then spreads it to four symbols by means of a Walsh code, and maps the four symbols to four successive resource elements. Therefore, one ACK/NACK signal is mapped to the four successive resource elements, and the four successive resource elements to which one ACK/NACK signal has been mapped are referred to as a Resource Element Group (REG). Additionally, an IQ multiplexing scheme may be applied, so that eight PHICH ACK/NACK signals may be multiplexed per REG at the maximum. The REG configured in this manner is generated repeatedly three times, and the repeatedly generated three REGs are scattered with a distance from one another on a frequency within the control region of all PRBs forming an available frequency band. At this point, a resource index for a Walsh code allocated for PHICH transmission for each terminal and an REG, etc. is determined by a function that uses a plurality of parameters such as a lowest index value among PRB indexes allocated during Physical Uplink Shared Channel (PUSCH) transmission, a circulation transition field value of a Demodulation RS (DM RS) within a PDCCH including a most recent uplink DCI format, etc. as an input. Therefore, a terminal may implicitly discriminate a PHICH related resource for the terminal itself using the above-described plurality of parameters.

As described above, the conventional LIE system transmits ACK/NACK information for uplink data using all PRBs forming a frequency band. However, since it is considered that a method of transmitting a PHICH using all PRBs forming a frequency band consumes a resource seriously because it should transmit a Reference Signal (RS) over an available entire frequency band, a PHICH transmission technology capable of reducing resource consumption is required. Furthermore, to obtain more improved PHICH reception performance, a PHICH transmission scheme suitable for various multi-antenna transmission techniques needs to be provided. Also, for more swift PHICH transmission in a PHICH transmission scheme applying a multi-antenna transmission technology, a feedback method needs to be provided.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for transmitting downlink HARQ information in a wireless communication system supporting an HARQ technique.

Another aspect of the present invention is to provide a method and an apparatus for determining a specific frequency region transmitting HARQ information in a wireless communication system supporting an HARQ technique.

Still another aspect of the present invention is to provide a method and an apparatus for obtaining a diversity gain by applying weight to each PRB allocated for a PHICH in a wireless communication system supporting an HARQ technique.

Yet another aspect of the present invention is to provide a method and an apparatus for obtaining a diversity gain by applying weight that considers a phase difference between antenna channels to each PRB allocated for a PHICH when applying a multi-antenna transmission technique in a wireless communication system supporting an HARQ technique.

Still yet another aspect of the present invention is to provide a method and an apparatus for allowing a terminal to transmit weight information via a PUSCH or a PUCCH in a wireless communication system supporting an HARQ technique.

In accordance with an aspect of the present invention, a method of a base station, for transmitting downlink Hybrid Automatic Repeat request (HARQ) information in a wireless communication system is provided. The method includes setting at least one Physical Resource Block (PRB) for transmitting a Physical HARQ Indicator Channel (PHICH) signal among all PRBs forming an available frequency band, determining a PHICH resource within the set at least one PRB, and transmitting a PHICH signal using the determined PHICH resource.

In accordance with another aspect of the present invention, a method of a terminal, for receiving downlink Hybrid Automatic Repeat request (HARQ) information in a wireless communication system is provided. The method includes obtaining information regarding at least one PRB resource set for transmission of a PHICH signal from a signal received from a base station, obtaining information regarding a PHICH resource within the set at least one PRB resource, and obtaining a PHICH signal from the PHICH resource.

In accordance with still another aspect of the present invention, an apparatus of a base station, for transmitting downlink Hybrid Automatic Repeat request (HARQ) information in a wireless communication system is provided. The apparatus includes a controller for setting at least one Physical Resource Block (PRB) for transmitting a Physical HARQ Indicator Channel (PHICH) signal among all PRBs forming an available frequency band, and determining a PHICH resource within the set at least one PRB, and a plurality of antennas for transmitting a PHICH signal using the determined PHICH resource.

In accordance with further another aspect of the present invention, an apparatus of a terminal, for receiving downlink Hybrid Automatic Repeat request (HARQ) information in a wireless communication system is provided. The apparatus includes a controller for obtaining information regarding at least one PRB resource set for transmission of a PHICH signal from a signal received from a base station, obtaining information regarding a PHICH resource within the set at least one PRB resource, and obtaining a PHICH signal from the PHICH resource.

In accordance with yet another aspect of the present invention, a method of a base station, for transmitting downlink Hybrid Automatic Repeat request (HARQ) information in a wireless communication system is provided. The method includes setting at least one Physical Resource Block (PRB) for transmitting a Physical HARQ Indicator Channel (PHICH) signal among all PRBs fixating an available frequency band, determining a PHICH resource within the set at least one PRB, repeatedly generating a PHICH signal to be transmitted to a terminal by a number of times set in advance, applying an arbitrary weight to the repeatedly generated PHICH signal transmitted via at least one of a plurality of antennas, and mapping a weight-applied PHICH signal to at least one PRB included in a PHICH resource and transmitting the same.

In accordance with still yet another aspect of the present invention, a method of a base station, for transmitting downlink Hybrid Automatic Repeat request (HARQ) information in a wireless communication system is provided. The method includes setting at least one Physical Resource Block (PRB) for transmitting a Physical HARQ Indicator Channel (PHICH) signal among all PRBs forming an available frequency band, determining a PHICH resource within the set at least one PRB, repeatedly generating a PHICH signal to be transmitted to a terminal by a number of times set in advance, setting weight with consideration of a phase difference between antenna channels using feedback information from a terminal, applying weight to the repeatedly generated PHICH signal transmitted via at least one of a plurality of antennas, and mapping a weight-applied PHICH signal to at least one PRB included in a PHICH resource and transmitting the same.

In accordance with still further yet another aspect of the present invention, a method of a terminal, for receiving downlink Hybrid Automatic Repeat request (HARQ) information in a wireless communication system is provided. The method includes: obtaining information regarding at least one PRB resource set for transmission of a PHICH signal from a signal received from a base station, obtaining information regarding a PHICH resource within the set at least one PRB resource, calculating a phase difference between transmission antenna channels of the base station using a reference signal received from the base station, transmitting information representing the phase difference between the transmission antenna channels to the base station, and obtaining a PHICH signal from at least one PRB included in a PHICH resource whose information has been obtained.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Hereinafter, a technology for transmitting downlink HARQ information in a wireless communication system supporting an HARQ technique is described.

In the description below, according to the present invention, for ACK/NACK transmission, a base station determines a specific frequency region as a resource for a Physical HARQ Indicator Channel (PHICH), that is, a resource for ACK/NACK transmission, and transmits ACK/NACK information via the determined specific frequency region. Also, for reception performance improvement of a terminal for a PHICH, the present invention applies a beamforming-based multi-antenna transmission technique to a relevant frequency region. At this point, a base station may arbitrarily set weight for beamforming and perform beamforming for a relevant frequency region, and the base station may receive feedback information from a terminal via an uplink data channel or an uplink control channel for beamforming of the base station and set beamforming weight based on the feedback information to perform beamforming for a relevant frequency region.

In the description below, though the present invention describes an example of repeatedly transmitting ACK/NACK information three times for convenience in description, the number of times of repetitions may change depending on design.

Figure 1A:
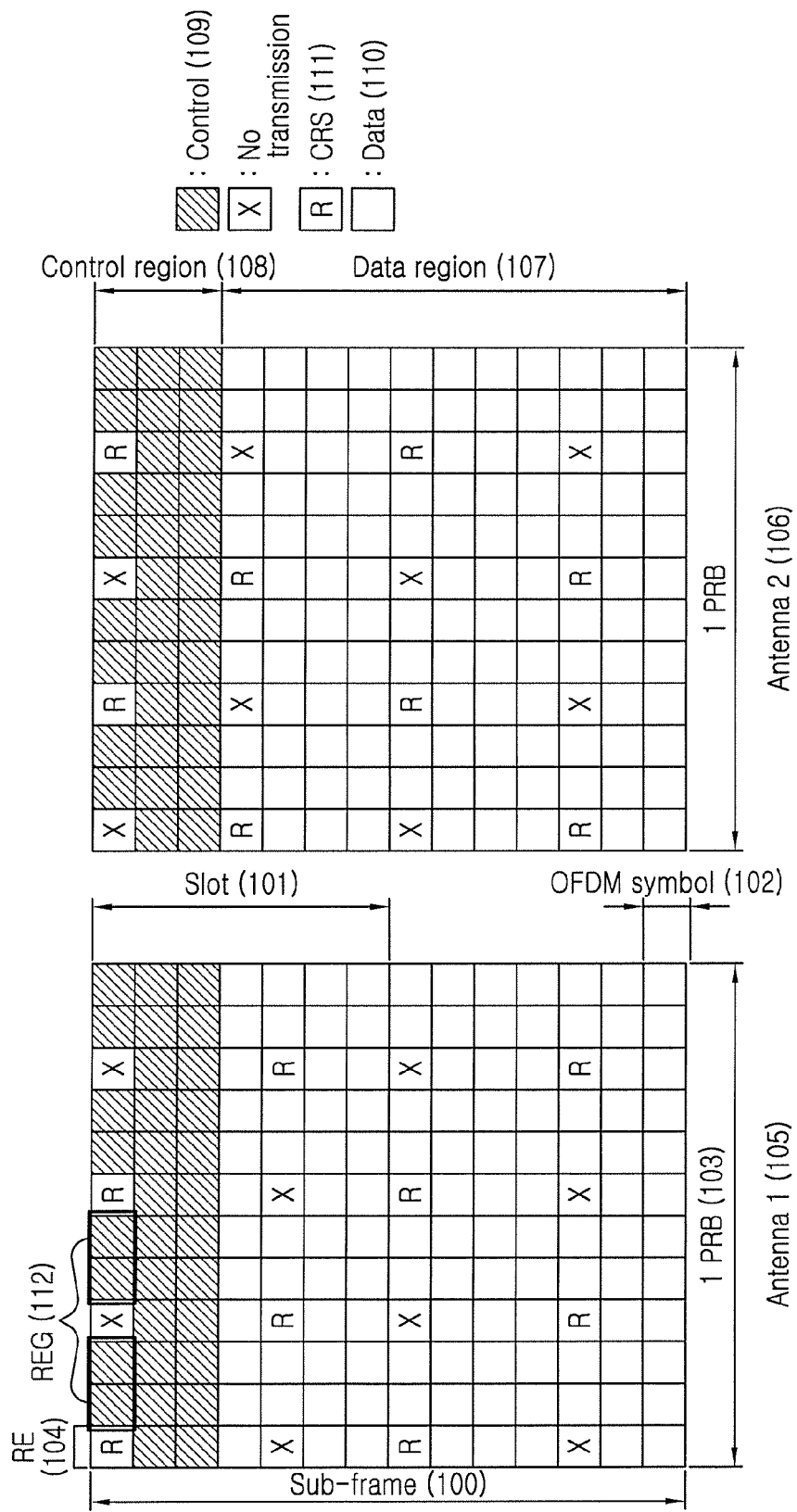
FIG. 1A is a view illustrating an ACK/NACK transmission structure in a conventional LTE system.
Figure 1B:
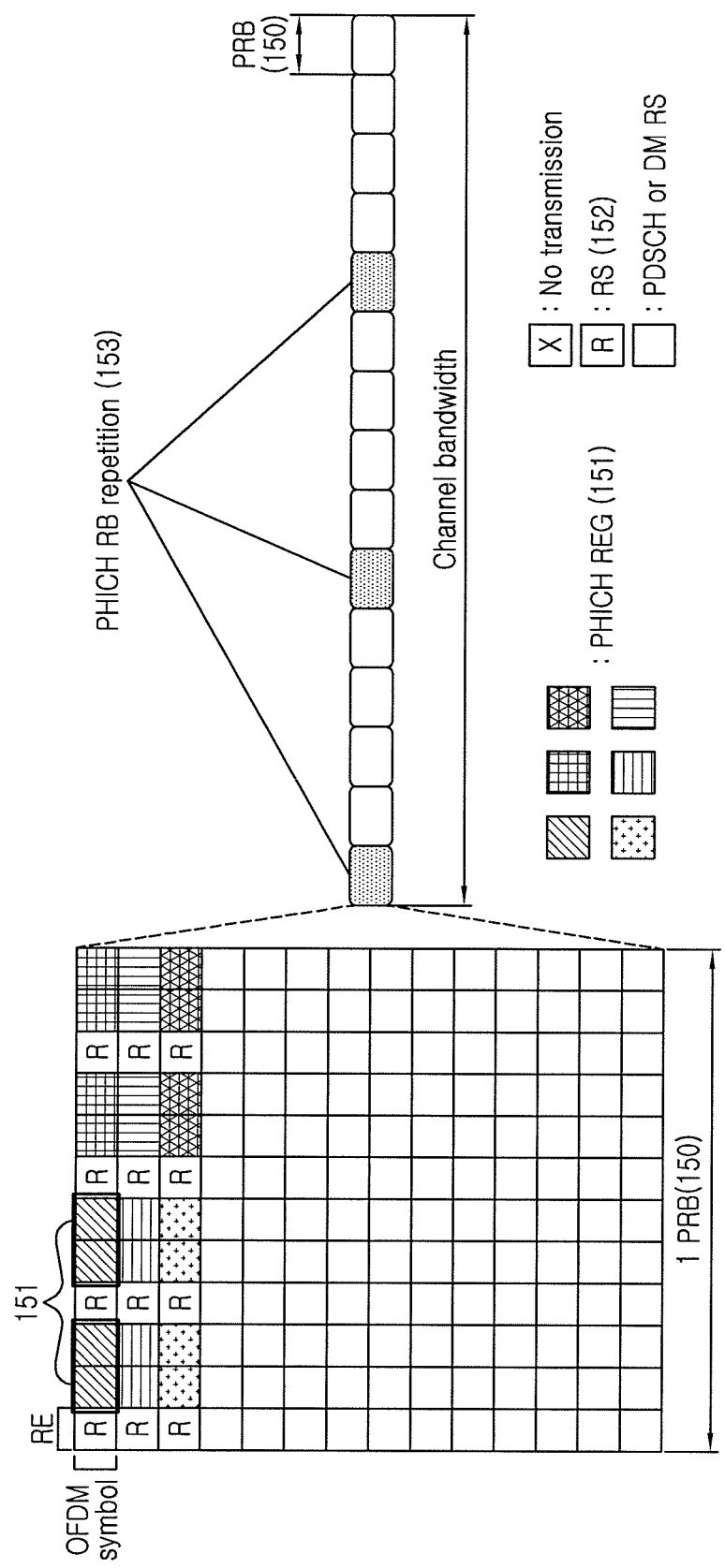
FIG. 1B is a view illustrating an example of an ACK/NACK transmission structure that uses a single transmission antenna in a wireless communication system according to the present invention.

FIG. 1B illustrates an example of an ACK/NACK transmission structure that uses a single transmission antenna in a wireless communication system according to the present invention.

Referring to FIG. 1B, a frequency band is configured by a plurality of PRBs 150. Here, the PRB is a resource allocation basis corresponding to 12 subcarriers in the frequency domain and one slot in the time domain, and is configured by Resource Elements (REs) corresponding to one subcarrier and one OFDM symbol. The present invention determines a specific frequency region, that is, a specific PRB as a PHICH transmission resource for transmitting ACK/NACK information for uplink data, and transmits ACK/NACK information within only the determined PRB. In the description below, a PRB determined for PHICH transmission is referred to as a PHICH PRB for convenience in description.

The present invention may determine the number of PHICH PRBs depending on base station setting and the number of times of repetitions of ACK/NACK. At this point, the determined PHICH PRBs have a dispersed shape with a distance from one another on a frequency. For example, as illustrated in FIG. 1B, in the case where the base station sets one ACK/NACK transmission PRB and repeatedly transmits a relevant PRB including ACK/NACK information three times, three PRBs 153 may be determined as a PRB for PHICH transmission. At this point, the three PHICH PRB 153 have a dispersed shape with a distance from one another on a frequency. Here, an index of a PHICH PRB may be set differently for each base station, each antenna, or each terminal. That is, PRBs used for PHICH transmission by respective base stations may be different from each other, and even the same base station may use a different PRB for PHICH transmission for each antenna. Also, each base station may set a PRB used for PHICH transmission with respect to each terminal.

Each PHICH PRB includes a Resource Element Group (REG) 151 representing ACK/NACK information for each terminal and a Reference Signal (RS) 152 for channel estimation of a terminal. Here, the RS may be the same signal as a Common RS (CRS) received in common by all terminals inside an existing cell, and may be a specialized signal for a PHICH PRB. That is, a terminal or a terminal group consisting of a plurality of specific terminals receiving a PHICH in a PHICH PRB resource may receive an RS for a PHICH PRB to use the same for demodulation of a PHICH for the terminal itself. Here, an amount of a resource consumed for the RS for a PHICH PRB is determined depending on a PHICH PRB region set depending on an amount of a PHICH. In contrast, since the existing CRS is an RS always transmitted by the base station via a determined resource, it may be advantageous in an aspect of RS resource consumption to use the RS for PHICH PRB rather than use a CRS. The present invention may increase the number of OFDM symbols for PHICH transmission of a relevant PHICH PRB on the time domain depending on the number of terminals needing ACK/NACK transmission or increase the number of PRBs for a PHICH on the frequency domain. For example, unlike a conventional wireless communication system where a PHICH is transmitted via one to three OFDM symbols within each PRB, the present invention may increase the number of OFDM symbols that transmit a PHICH within the relevant PRB, and accordingly set all relevant PRBs to PHICH transmission resources.

Also, to represent a PHICH PRB and an REG of each terminal, that is, a PHICH REG when mapping a PHICH REG to actual PRE REs, the present invention may use two methods. A first method is a method for determining REs to which a PHICH of each terminal is to be mapped as an index of a PHICH PRB and an index of a PHICH REG inside a relevant PHICH PRB. The first method may represent a PRB determined as a PHICH PRB used by a relevant terminal using the PHICH PRB index, and represent an REG allocated to the relevant terminal within a relevant PRB using the PHICH REG index. A second method is a method using only an index of a PHICH PRB, and represents an index of a PHICH REG as "PHICH PRB index*the number of REGs per PRB+REG index allocated to relevant terminal within relevant PHICH PRB". Therefore, when the PHICH REG index is divided by the number of REGs per PRB in the second method, the quotient may represent an index of a PHICH PRB and a remainder may represent an index of an REG allocated to the relevant terminal within an index of a PHICH PRB.

As described above, for a PHICH that transmits downlink ACK/NACK information, the present invention does not use all PRBs but uses only specific PRBs corresponding to a specific frequency region.

Figure 2:
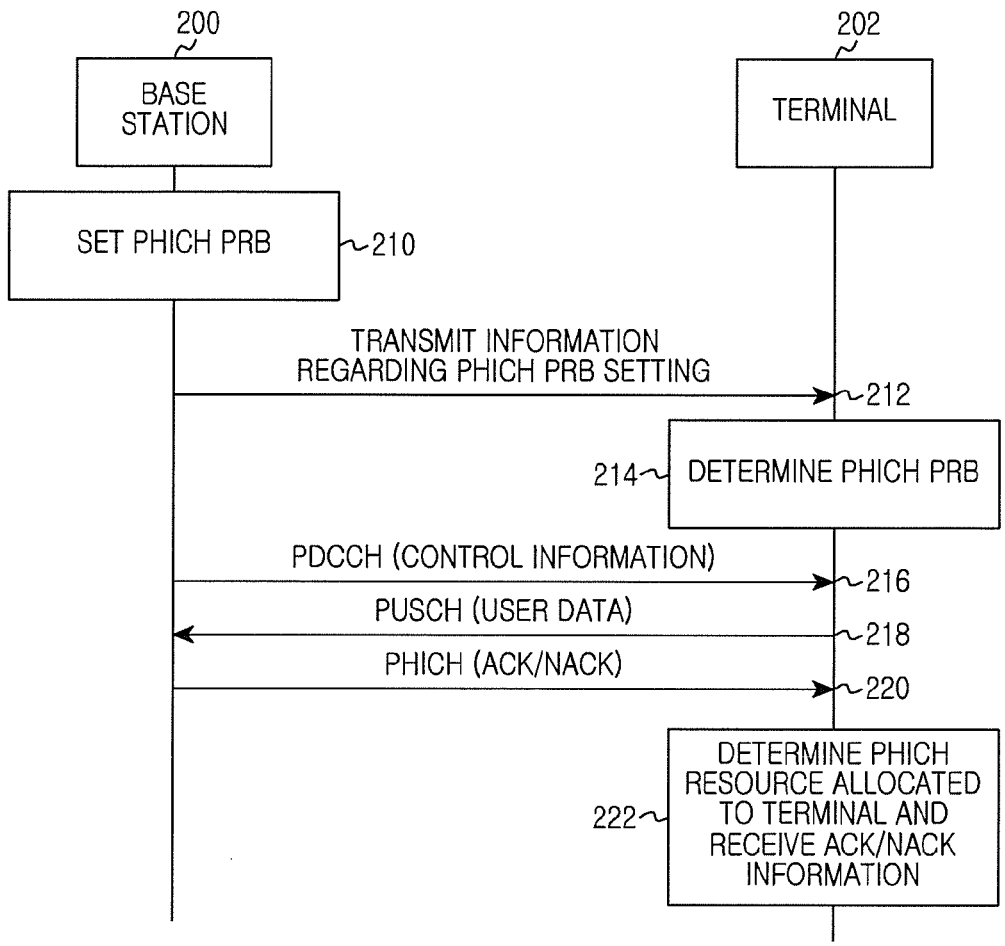
FIG. 2 is a view illustrating a signal flow for ACK/NACK transmission in a wireless communication system according to the present invention.

FIG. 2 illustrates a signal flow for ACK/NACK transmission in a wireless communication system according to the present invention.

Referring to FIG. 2, the base station 200 sets PRBs for PHICH transmission, that is, PHICH PRBs in step 210, and proceeds to step 212 to transmit information regarding PHICH PRB setting to a terminal 202. In step 210, the base station may select PRBs that are not adjacent to each other on the frequency domain to determine them as PHICH PRBs, and may inform the terminal of information regarding the PHICH PRB setting via Radio Resource Control signaling or other signalings in step 212.

Then, the terminal 212 receives information regarding the PHICH PRB setting and a PRB set via which a PHICH may be transmitted from the base station in step 214.

After that, the base station 200 transmits control information to the terminal via a PDCCH in step 216. Here, the control information includes scheduling information such as data channel allocation information, power control information, etc.

After that, the terminal 202 transmits user data to the base station 200 via a PUSCH based on control information received from the base station 200 in step 218. Here, in the case where the base station 200 requires feedback information, the terminal according to the present invention may transmit feedback information via the PUSCH. That is, as in embodiments of FIGS. 7 to 15 described below, in the case where the base station 200 sets weight for a PHICH PRB using feedback information of the terminal 202, the terminal 202 may transmit the feedback information together when transmitting user data via the PUSCH.

After that, the base station 200 determines ACK/NACK for data transmitted from the terminal 202, and transmits ACK/NACK information via a PHICH REG for the relevant terminal 202 within a PHICH PRB. At this point, the base station 200 according to the present invention may apply weight to PHICH PRBs transmitted to a specific antenna in order to obtain a diversity gain. That is, as described with reference to FIGS. 3 to 6, the base station 200 may apply arbitrary weight, and apply weight with consideration of a phase difference between antenna channels based on feedback information from the terminal as described with reference to FIGS. 7 to 15.

After that, the terminal 202 proceeds to step 222 to determine a PHICH resource allocated to the terminal itself with respect to the PHICH PRB determined in step 214 and receive ACK/NACK information corresponding to the terminal 202 via an REG within a specific PRB as in the conventional method. Here, the terminal may implicitly discriminate PHICH related resources for the terminal itself depending on a method promised in advance with the base station. For example, as well known in the conventional art, the terminal 202 may determine a resource index for a Walsh code and an REG, etc. allocated for PHICH transmission for the terminal 202 itself by a function that uses a plurality of parameters such as a lowest index value among PRB indexes allocated during PUSC transmission, a circulation transition field value of a DM Demodulation RS (DMRS) within a PDCCH including a most recent uplink DCI format, etc. as an input. At this point, the terminal 202 may determine a PHICH PRB for the terminal 202 among a PHICH PRB set based on the determined REG index.

Then, description is made on a method for transmitting a PHICH PRB using a multi-antenna technique in order to improve reception performance of a terminal for a PHICH with reference to FIGS. 3 to 19. In the description below, description is made on the assumption that a transmission end of a base station has two antennas and a reception end of a terminal has one antenna for convenience in description. However, the number of the transmission end antennas of the base station and the reception end antennas may change within a scope that does not depart from the spirit of the present invention.

Figure 3:
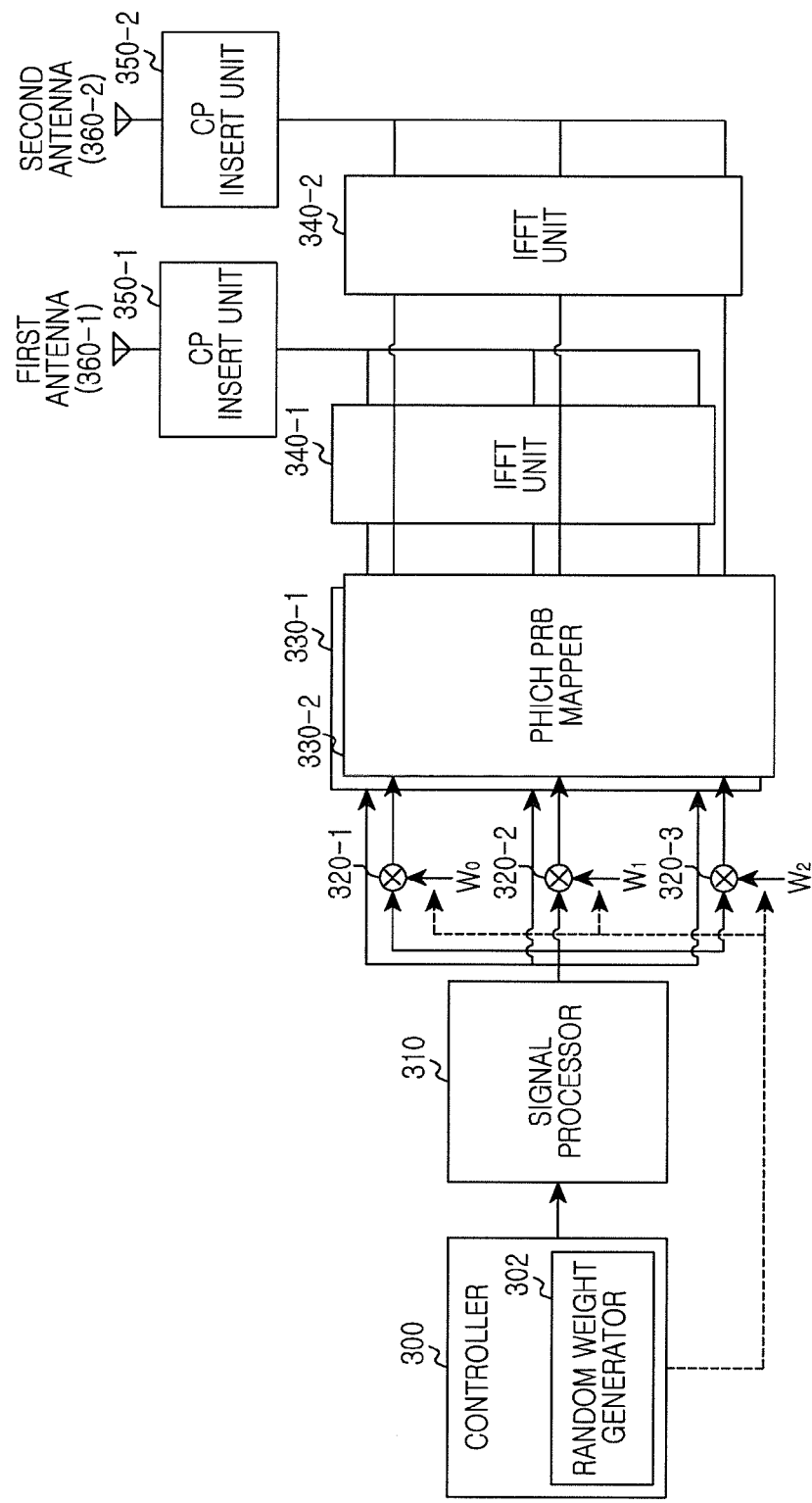
FIG. 3 is a block diagram illustrating a base station for transmitting a PHICH in a wireless communication system of an open loop structure according to an embodiment of the present invention.

FIG. 3 is a block diagram illustrating a base station for transmitting a PHICH in a wireless communication system of an open loop structure according to an embodiment of the present invention.

Referring to FIG. 3, the base station includes a controller 300, a signal processor 310, first to third weight appliers 320-1 to 320-3, a first PHICH PRB mapper 330-1, a second PHICH PRB mapper 330-2, a first IFFT unit 340-1, a second IFFT unit 340-2, a first CP insert unit 350-1, a second CP insert unit 350-2, a first antenna 360-1, and a second antenna 360-2.

First, the controller 300 controls and processes an overall operation of the base station, and controls and processes a function for performing communication based on an HARQ scheme. Particularly, according to the present invention, the controller 300 controls and processes a function for selecting PRBs for transmitting a PHICH among all PRBs forming an available frequency band to determine the same as PHICH resources, and transmitting a PHICH within the determined PHICH resources. At this point, the controller 300 selects PRBs that are not adjacent to each other on the frequency domain to determine the same as PHICH resources. The controller 300 determines PHICH transmission information (ex: Walsh code index, REG index) of respective terminals to be transmitted via the set PHICH resources. Also, the controller 300 controls and processes a function for repeating an ACK/NACK signal for each terminal three times and mapping the same to PHICH PRBs, respectively, included in the PHICH resources determined in advance, and transmitting the mapped PRBs via the first antenna 360-1 and the second antenna 360-2. At this point, the controller 300 controls and processes a function for performing beamforming for a transmission signal in order to improve reception performance of a terminal. That is, the controller 300 controls and processes a function for applying weight for beamforming to PHICH PRBs transmitted via the second antenna 360-2, and not applying weight to PHICH PRBs transmitted via the first antenna 360-1. That is, the controller 300 controls and processes a function for arbitrarily generating weights $w_0$, $w_1$, and $w_2$ to be applied to three PHICH PRBs, respectively, transmitted via the first antenna 360-1, and setting the generated weights $w_0$, $w_1$, and $w_2$ to first to third weight appliers 320-1 to 320-3, respectively, by including a random weight generator 302.

Figure 4:
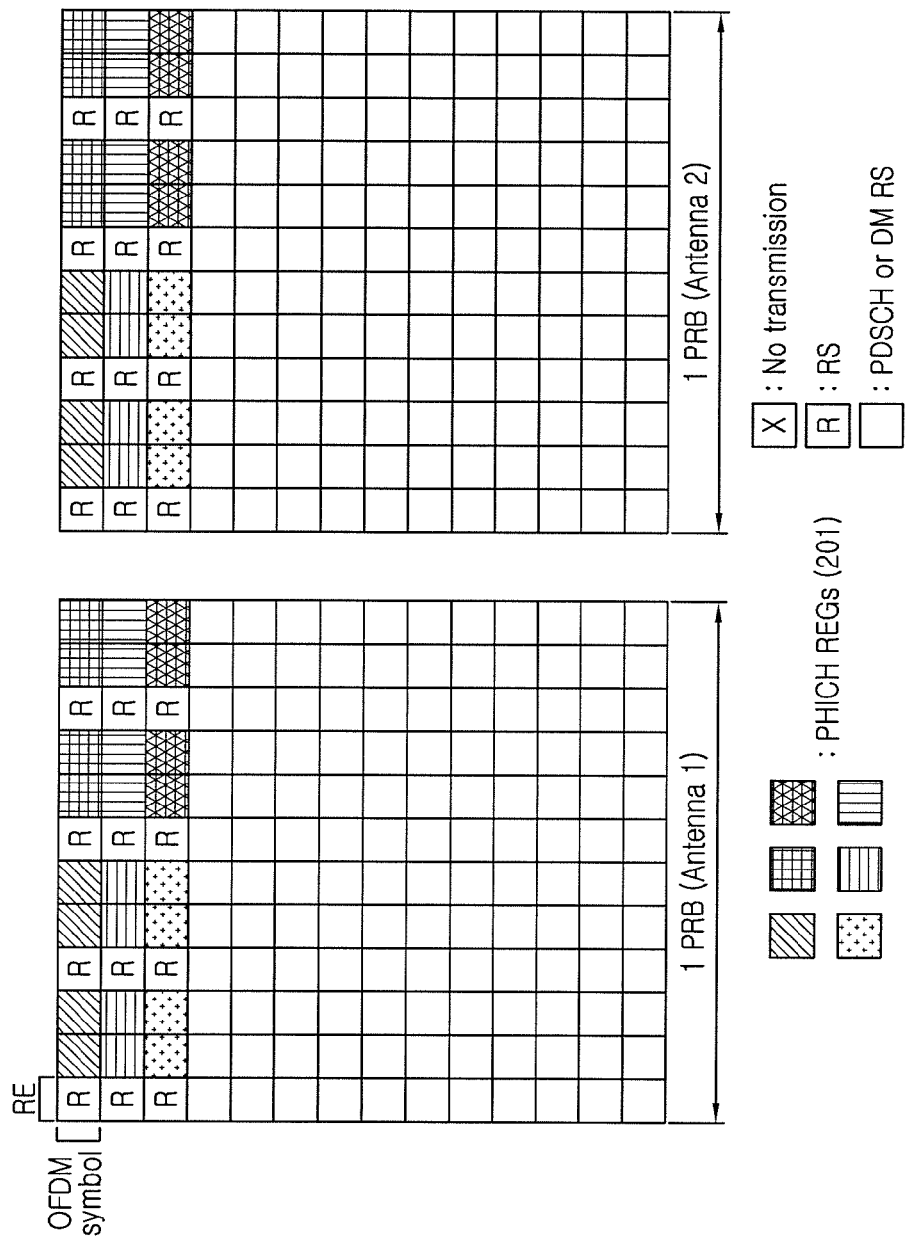
FIG. 4 is a view illustrating an example of a physical resource block for transmitting a PHICH in a wireless communication system of an open loop structure according to an embodiment of the present invention.
Figure 5:
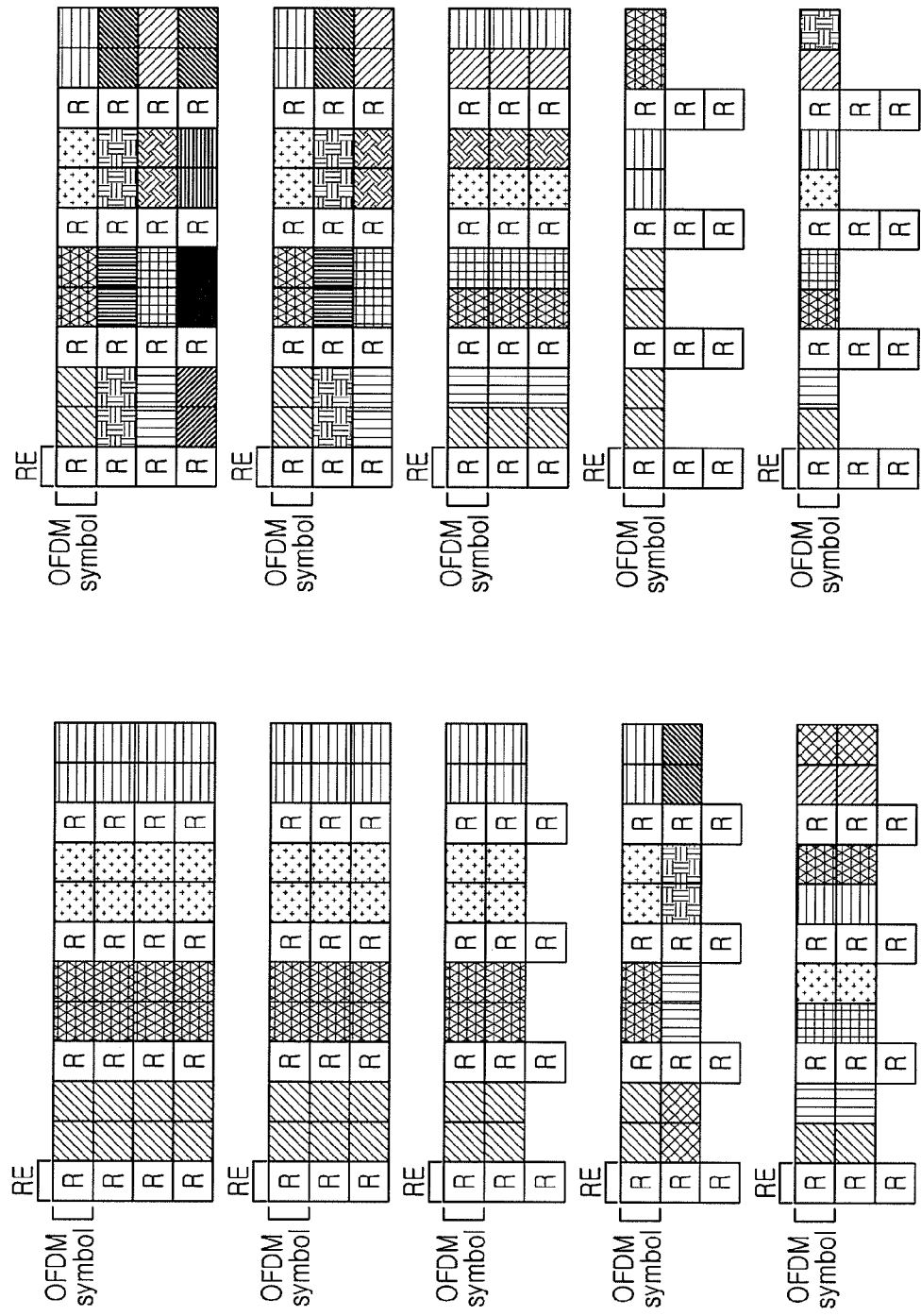
FIG. 5 is a view illustrating examples of various structures for transmitting a PHICH in a wireless communication system of an open loop structure according to an embodiment of the present invention.

Also, the controller 300 generates an ACK/NACK signal depending on a reception result of user data received from the terminal, and outputs the ACK/NACK signal to the signal processor 310. Also, the controller 300 generates a Reference Signal (RS) for a PHICH PRB and outputs the same. In the description below, for convenience in description, a PHICH signal is used as a collective terminology for an ACK/NACK signal and an RS for a PHICH PRB. At this point, as illustrated in FIG. 4, the controller 300 controls a function for mapping an RS signal to the same Resource Element (RE) of each PHICH PRB transmitted via the first antenna 360-1 and the second antenna 360-2. Also, as illustrated in FIG. 5, the controller 300 controls and processes a function for transmitting a PHICH in various forms according to a Walsh code length and a PHICH REG mapping method. At this point, the number of OFDM symbols transmitting a PHICH signal within a PHICH PRB may change depending on a design scheme. Also, a time domain start point transmitting a PHICH signal in a PHICH PRB is not limited to a first OFDM symbol of a subframe but may change.

The signal processor 310 performs scrambling and modulation on a signal provided from the controller 300, and outputs the same.

The first to third weight appliers 320-1 to 320-3 change the phase of a PHICH signal output from the signal processor 310 using the weights $w_0$, $w_1$, and $w_2$ set to arbitrary values by the controller 300, and output the same. At this point, the weights $w_0$, $w_1$, and $w_2$ of the respective first to third weight appliers 320-1 to 320-3 are set to values different from one another.

The first PHICH PRB mapper 330-1 maps a PHICH signal output from the signal processor 310 to a region of a PHICH PRB determined in advance. At this point, respective PHICH signals repeatedly output from the signal processor 310 are mapped to different PHICH PRB regions.

The second PHICH PRB mapper 330-2 maps respective PHICH signals whose phases have been changed by different weights from the first to third weight appliers 320-1 to 320-3 to a region of a PHICH PRB determined in advance by the controller 300. At this point, the respective PHICH signals output from the first to third weight appliers 320-1 to 320-3 are mapped to PHICH PRB regions different from one another. For example, in the case where PRBs determined for transmitting a PHICH by the controller 300 are PHICH PRBs 0, 1, and 2, a PHICH signal output from the first weight applier 320-1 is mapped to a region of a PHICH PRB 0, a PHICH signal output from the second weight applier 320-2 is mapped to a region of a PHICH PRB 1, and a PHICH signal output from the third weight applier 320-3 is mapped to a region of a PHICH PRB 2.

The first IFFT unit 340-1 and the second IFFT unit 340-2 perform an IFFT operation on a signal output from the first PHICH PRB mapper 330-1 and the second PHICH PRB mapper 330-2, and then output the same to the first CP insert unit 350-1 and the second CP insert unit 350-2. The first CP insert unit 350-1 and the second CP insert unit 350-2 insert a Cyclic Prefix (CP) to an input signal and output the same to the first antenna 360-1 and the second antenna 360-2.

Figure 6:
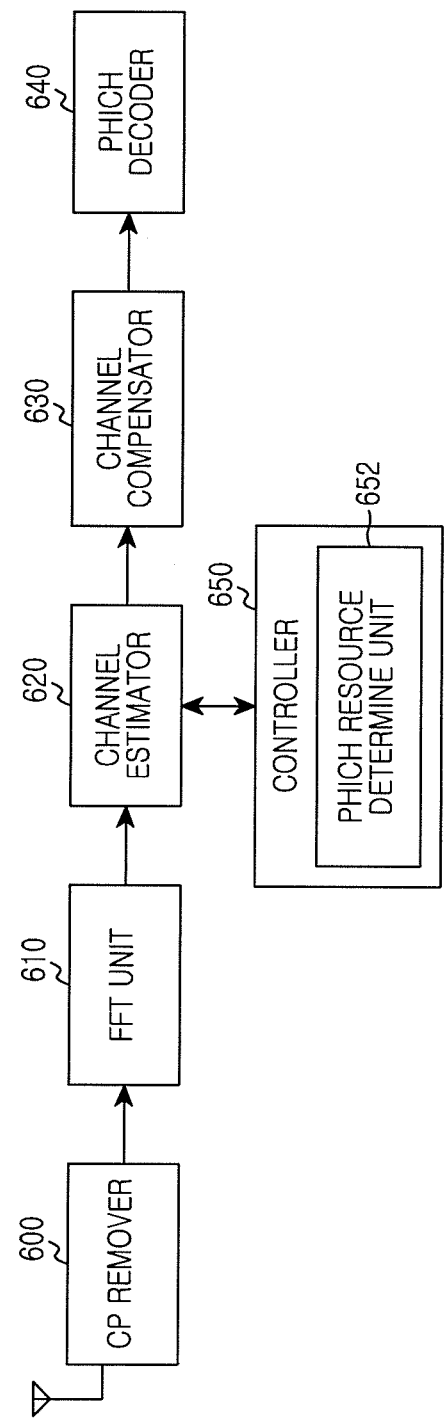
FIG. 6 is a block diagram illustrating a terminal for receiving a PHICH in a wireless communication system of an open loop structure according to an embodiment of the present invention.

FIG. 6 is a block diagram illustrating a terminal for receiving a PHICH in a wireless communication system of an open loop structure according to an embodiment of the present invention.

Referring to FIG. 6, the terminal includes a CP remover 600, an FFT unit 610, a channel estimator 620, a channel compensator 630, a PHICH decoder 640, and a controller 650.

First, the controller 650 controls and processes an overall operation of the terminal, and controls and processes a function for performing communication based on an HARQ scheme. Particularly, the controller 650 determines a frequency region to which a PHICH signal may be mapped, that is, a PHICH PRB based on information regarding a PHICH PRB received from a base station by including a PHICH resource determine unit 652. After that, the controller 650 controls and processes a function for receiving a PHICH signal within the PRB via which a PHICH signal is transmitted, that is, the PHICH PRB.

The CP remover 600 removes a CP from a signal received from an antenna, and outputs a CP-removed signal to the FFT unit 610. The FFT unit 610 performs an FFT operation on the signal output from the CP remover 600 to output the same to the channel estimator 620. The channel estimator 620 estimates a channel from an RS of a PHICH PRB from the signal output from the FFT 610, and outputs the estimated channel information to the channel compensator 630 under control of the controller 650. The channel compensator 630 performs channel compensation on a received signal using the estimated channel information, and outputs the channel-compensated signal to the PHICH decoder 640. The PHICH decoder 640 performs decoding on the channel-compensated signal to perform a function for detecting ACK/NACK information.

As described above, assuming that frequency selectivity for a channel between a base station and a terminal is low and a channel response for an available entire frequency band is the same in an open loop system having the structure of FIGS. 3 and 6, a reception signal of the terminal may be expressed by Equation (1) depending on beamforming of the base station.

$$y_0 = h_0 s + h_1 w_0 s + n_0$$

$$y_1 = h_0 s + h_1 w_1 s + n_1$$

$$y_2 = h_0 s + h_1 w_2 s + n_2 \quad (1)$$

where $y_0$, $y_1$, and $y_2$ represent reception signals of the terminal, respectively, in the frequency domain with respect to PHICH PRBs 0, 1, and 2, and $h_0$ and $h_1$ represent frequency domain channel responses with respect to the terminal from respective transmission antennas of the base station, s represents a PHICH symbol within a PHICH PRB, and $n_0$, $n_1$, $n_2$ represent noises for PHICH PRBs 0, 1, and 2, respectively. Also, $w_0$, $w_1$, $w_2$ represent arbitrary weights applied to PHICH PRBs 0, 1, and 2 to be transmitted via respective transmission antennas of the base station, that is, the second antenna 360-2, and an absolute value of these weights is 1.

Accordingly, a reception signal y of the terminal may be expressed by Equation (2) below. That is, when channel estimation is performed on reception signals $y_0$, $y_1$, and $y_2$ for respective PHICH PRBs 0, 1, and 2 illustrated in Equation (1) and then the reception signals $y_0$, $y_1$, and $y_2$ are combined, it may be expressed by Equation (2) below.

$$y = (h_0 + h_1 w_0)^* y_0 + (h_0 + h_1 w_1)^* y_1 + (h_0 + h_1 w_2)^* y_2 \quad (2)$$

$$= \{|h_0 + h_1 w_0|^2 + |h_0 + h_1 w_1|^2 + |h_0 + h_1 w_2|^2\} \cdot s + n$$

where n represents a value obtained by combining noises $n_0$, $n_1$, $n_2$ after channel compensation, and $(\bullet)^*$ represents a complex conjugate.

Equation (2) shows a value of $|\bullet|^2$ has a different frequency channel response by $w_0$, $w_1$, $w_2$, so that the terminal obtains a diversity gain. That is, in the case where the base station does not apply weight to PHICH PRBs transmitted via a specific antenna, all of frequency channel responses for respective PHICH PRBs are constant as $|h_0+h_1|^2$, so that a diversity gain cannot be obtained. However, the present invention may improve a reception performance of the terminal for a PHICH signal under an environment where channel selectivity is low by applying an arbitrary weight to PHICH PRBs transmitted via a specific antenna.

Of course, under an environment where channel selectivity between a base station and a terminal is high in the above-described open loop system, even when a beamforming technique applying weight to respective PHICH PRBs is not used, frequency channel responses are different, so that a diversity gain may be obtained.

Figure 7:
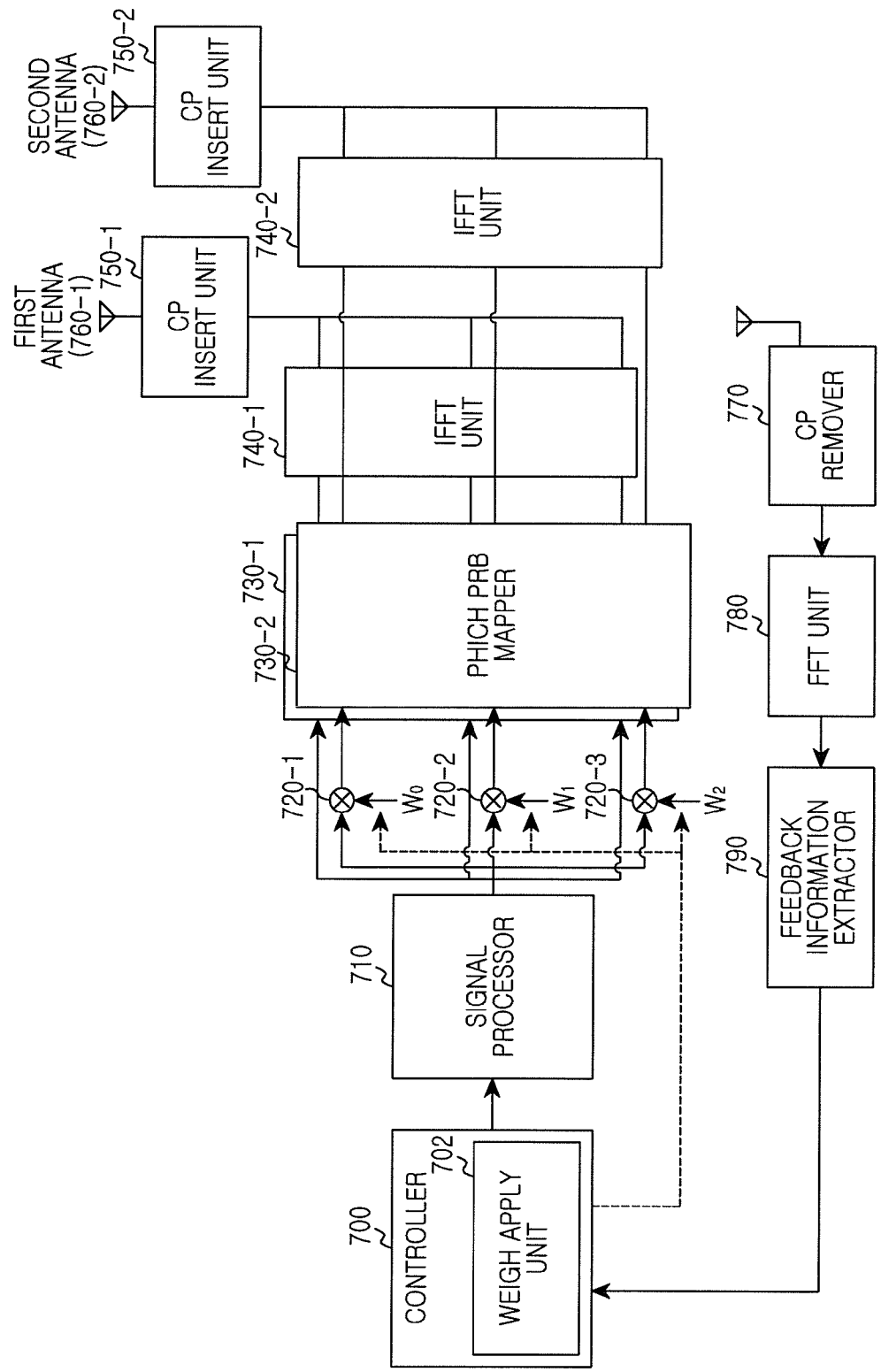
FIG. 7 is a block diagram illustrating a base station for transmitting a PHICH in a wireless communication system of a closed loop structure according to another embodiment of the present invention.

FIG. 7 is a block diagram illustrating a base station for transmitting a PHICH in a wireless communication system of a closed loop structure according to another embodiment of the present invention.

Referring to FIG. 7, the base station includes a controller 700, a signal processor 710, first to third weight appliers 720-1 to 720-3, a first PHICH PRB mapper 730-1 and a second PHICH PRB mapper 730-2, a first IFFT unit 740-1 and a second IFFT unit 740-2, a first CP insert unit 750-1 and a second CP insert unit 750-2, a first antenna 760-1 and a second antenna 760-2, a CP remover 770, an FFT unit 780, and a feedback information extractor 790.

First, the controller 700 controls and processes an overall operation of the base station, and controls and processes a function for performing communication based on an HARQ scheme. Particularly, according to the present invention, the controller 700 controls and processes a function for selecting PRBs for transmitting a PHICH among all PRBs forming an available frequency band and determining the same as PHICH resources, and transmitting a PHICH within the determined PHICH resources. At this point, the controller 700 selects PRBs that are not adjacent to one another on the frequency domain and determines the same as PHICH resources. The controller 700 determines PHICH transmission information (ex: Walsh code index, REG index) of respective terminals to be transmitted via set PHICH resources.

Also, the controller 700 controls and processes a function for repeating an ACK/NACK signal for each terminal three times and mapping the same to PHICH PRBs, respectively, included in a PHICH resource determined in advance, and transmitting the mapped PRBs via the first antenna 760-1 and the second antenna 760-2. At this point, the controller 700 controls and processes a function for performing beamforming for a transmission signal in order to improve reception performance of a terminal. That is, the controller 700 controls and processes a function for applying weight for beamforming to PHICH PRBs transmitted via the second antenna 760-2, and not applying weight to PHICH PRBs transmitted via the first antenna 760-1. Particularly, the controller 700 controls and processes a function for generating weights $w_0$, $w_1$, $w_2$ to be applied to three PHICH PRBs transmitted via the second antenna 760-2 based on a phase difference between antenna channels, and setting the generated $w_0$, $w_1$, $w_2$ to the first to third weight appliers 720-1 to 720-3, respectively, by including a weight setting unit 702. That is, the controller 700 determines a phase difference for each PHICH PRB for the first antenna 760-1 and the second antenna 760-2 from feedback information from a terminal, and generates the determined phase difference as the weights $w_0$, $w_1$, $w_2$. At this point, the feedback information from the terminal may be phase difference information for each PHICH PRB between transmission antenna channels of the base station, information representing a difference value for a previous phase difference for each PHICH PRB, phase information of a PHICH PRB for each transmission antenna, or information regarding a phase and a size. That is, the feedback information has meaning that includes all information for obtaining weight for each PHICH PRB between transmission antenna channels.

Figure 8:
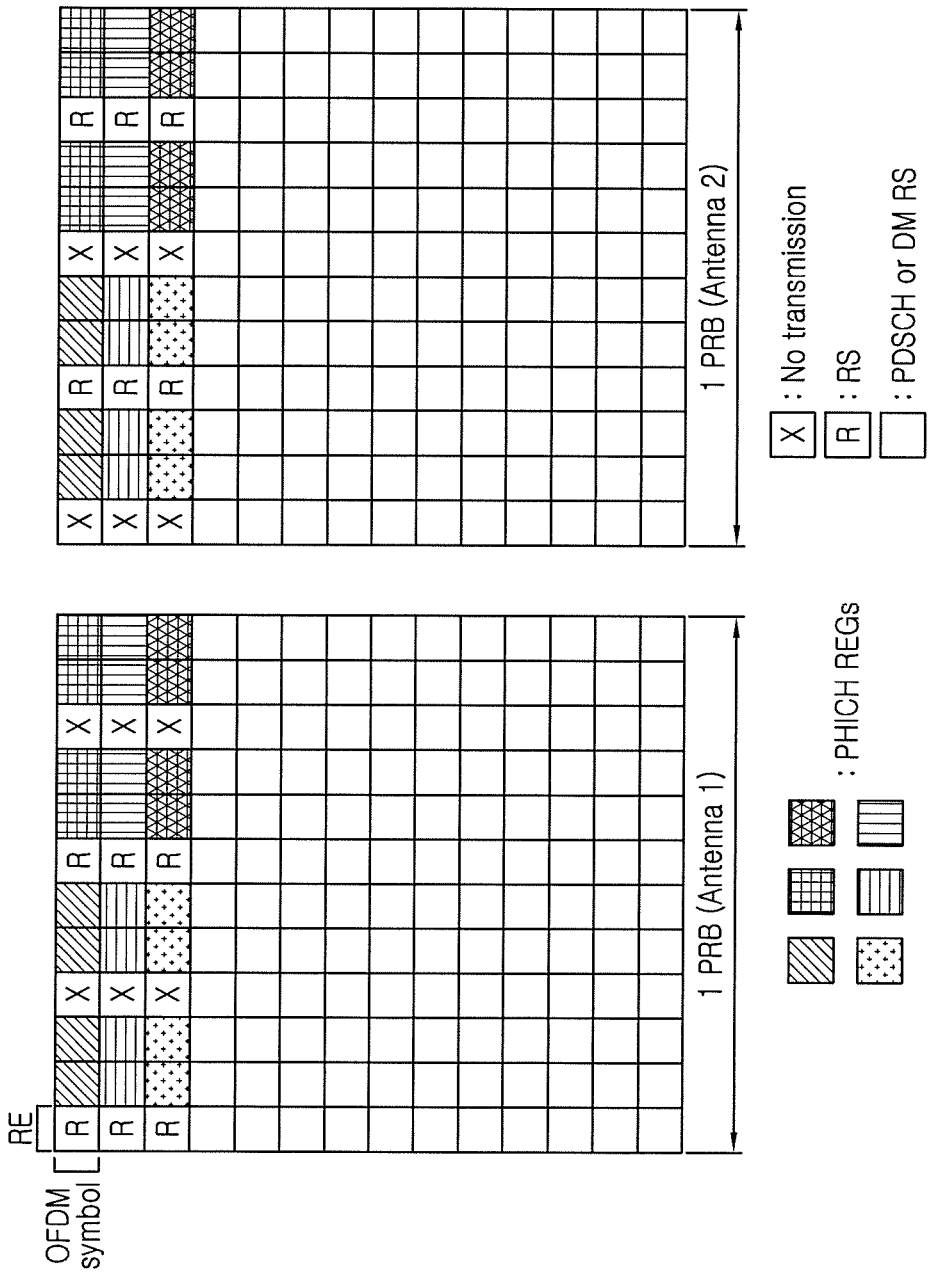
FIG. 8 is a view illustrating an example of a physical resource block for transmitting a PHICH in a wireless communication system of a closed loop structure according to another embodiment of the present invention.

Also, the controller 700 generates an ACK/NACK signal depending on a reception result of user data received from the terminal, and outputs the ACK/NACK signal to the signal processor 710. Also, the controller 700 generates a Reference Signal (RS) for a PHICH PRB and outputs the same. In the description below, for convenience in description, a PHICH signal is used as a collective terminology for an ACK/NACK signal and an RS for a PHICH PRB. At this point, as illustrated in FIG. 8, the controller 700 controls a function for preventing an RS signal from being mapped to the same RE of each PHICH PRB transmitted to the first antenna 760-1 and the second antenna 760-2. That is, the controller 700 controls a function for allowing an RS signal to be mapped to different REs of each PHICH PRB transmitted to the first antenna 760-1 and the second antenna 760-2. Also, the controller 700 controls and processes a function for allowing the weights $w_0$, $w_1$, $w_2$ not to be applied to an RS in a PHICH signal, and allowing the weights $w_0$, $w_1$, $w_2$ to be applied to ACK/NACK.

Figure 9:
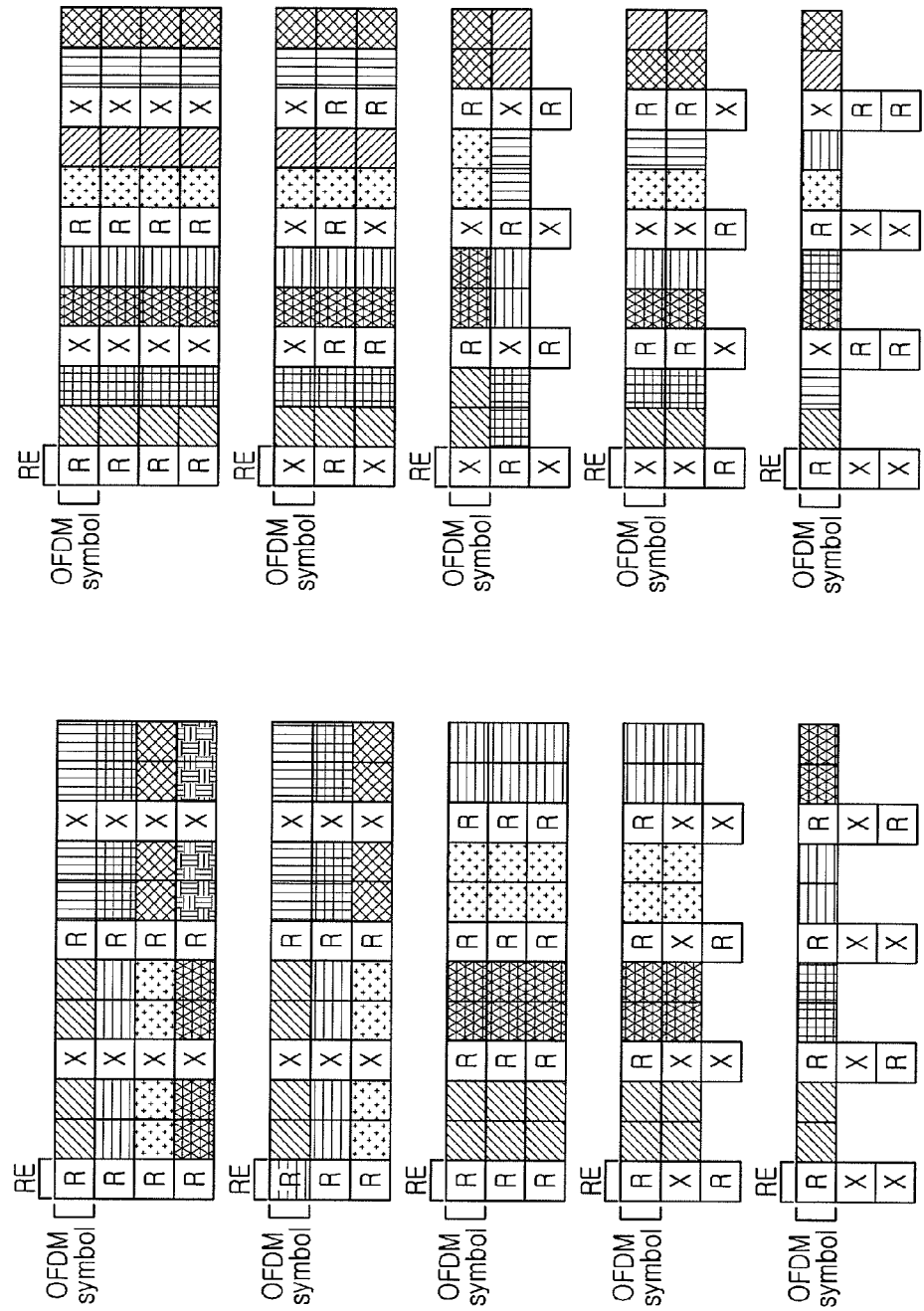
FIG. 9 is a view illustrating examples of various structures for transmitting a PHICH in a wireless communication system of a closed loop structure according to another embodiment of the present invention.

Also, as illustrated in FIG. 9, the controller 700 controls and processes a function for transmitting a PHICH in various forms depending on a Walsh code length and a PHICH REG mapping method. At this point, the number of OFDM symbols that transmit a PHICH signal within a PHICH PRB may change depending on a design scheme. Also, a time domain start point that transmits a PHICH signal in a PHICH PRB is not limited to a first OFDM symbol of a subframe but may change.

The signal processor 710 performs scrambling and modulation on a signal provided from the controller 700, and outputs the same.

The first to third weight appliers 720-1 to 720-3 change the phase of a PHICH signal, that is, an ACK/NACK signal output from the signal processor 710 using the weights $w_0$, $w_1$, $w_2$ set by the controller 700, and outputs the same under control of the controller 700. At this point, the weights $w_0$, $w_1$, $w_2$ of the first to third weight appliers 720-1 to 720-3 are set by a phase difference between a channel between the first antenna 760-1 and the terminal, and a channel between the second antenna 760-2 and the terminal. Here, the first to third weight appliers 720-1 to 720-3 do not apply weight to an RS, and apply weight to only an ACK/NACK signal under control of the controller 700.

The first PHICH PRB mapper 730-1 maps a PHICH signal output from the signal processor 710 to a region of a PHICH PRB determined in advance. At this point, respective PHICH signals repeatedly output from the signal processor 710 are mapped to PHICH PRB regions different from one another.

The second PHICH PRB mapper 730-2 maps a PHICH signal whose phase has changed from the first to third weight appliers 720-1 to 720-3 to a region of a PHICH PRB determined in advance by the controller 700. At this point, respective PHICH signals output from the first to third weight appliers 720-1 to 720-3 are mapped to PHICH PRB regions different from one another. For example, in the case where PRBs for transmitting a PHICH, determined by the controller 700 are PHICH PRB 0, 1, 2, a PHICH signal output from the first weight applier 720-1 is mapped to a region of a PHICH PRB 0, a PHICH signal output from the second weight applier 720-2 is mapped to a region of a PHICH PRB 1, and a PHICH signal output from the third weight applier 720-3 is mapped to a region of a PHICH PRB 2.

The first IFFT unit 740-1 and the second IFFT unit 740-2 perform an IFFT operation on a signal output from the first PHICH PRB mapper 730-1 and the second PHICH PRB mapper 730-2, and then output the same to the first CP insert unit 750-1 and the second CP insert unit 750-2. The first CP insert unit 750-1 and the second CP insert unit 750-2 insert a CP to an input signal, and then output the same to the first antenna 760-1 and the second antenna 760-2.

The CP remover 770 removes a CP from a signal received from the terminal via a reception antenna, and the FFT unit 780 performs an FFT operation on a signal from the CP remover 770 and outputs the same to the feedback information extractor 790. The feedback information extractor 790 extracts feedback information representing a phase difference between antenna channels from a signal from the FFT unit 780 to provide the same to the controller 700. Here, the feedback information representing the phase difference between the antenna channels may be received via a PUSCH or a PUCCH.

Figure 10:
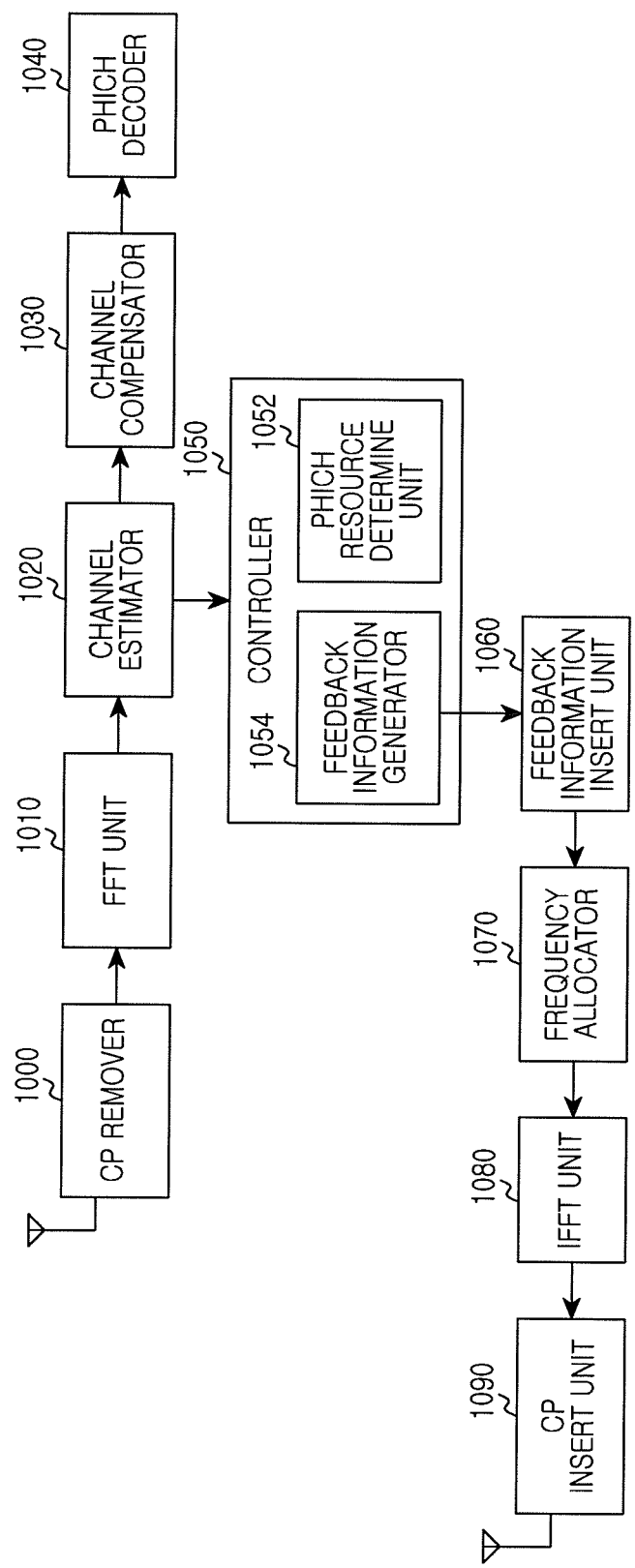
FIG. 10 is a block diagram illustrating a terminal for receiving a PHICH in a wireless communication system of a closed loop structure according to another embodiment of the present invention.

FIG. 10 is a block diagram illustrating a terminal for receiving a PHICH in a wireless communication system of a closed loop structure according to another embodiment of the present invention.

Referring to FIG. 10, the terminal includes a CP remover 1000, an FFT unit 1010, a channel estimator 1020, a channel compensator 1030, a PHICH decoder 1040, a controller 1050, a feedback information insert unit 1060, a frequency allocator 1070, an IFFT unit 1080, and a CP insert unit 1090.

First, the controller 1050 controls and processes an overall operation of the terminal and controls and processes a function for performing communication based on an HARQ scheme. Particularly, the controller 1050 determines a frequency domain to which a PHICH signal may be mapped, that is, a PHICH PRB based on information regarding a PHICH resource received from a base station by including a PHICH resource determine unit 1052. After that, the controller 1050 controls and processes a function for receiving a PHICH signal within a PRB where it has been determined that a PHICH signal is transmitted, that is, a PHICH PRB.

Also, the controller 1050 controls and processes a function for estimating a channel based on an RS received from the base station to calculate a phase difference between antenna channels of the base station with respect to each PHICH PRB, generating feedback information representing the calculated phase difference, and feeding back the same by including a feedback information generator 1054. For example, assuming that PRBs determined for use in PHICH transmission are PHICH PRB 0, 1, 2, the feedback information generator 1050 receives an RS of the PHICH PRB 0 from the first transmission antenna of the base station to measure a signal phase $\theta_0$, and receives an RS of the PHICH PRB 0 from the second transmission antenna of the base station to measure a signal phase $\theta_1$ to calculate a phase difference. Here, the feedback information may be phase difference information for each PHICH PRB between transmission antenna channels of the base station, information representing a difference value for a previous phase difference for each PHICH PRB, phase information of a PHICH PRB for each transmission antenna, or information regarding a phase and a size. That is, the feedback information has meaning that includes all information for obtaining weight for each PHICH PRB between transmission antenna channels of the base station.

Figure 11:
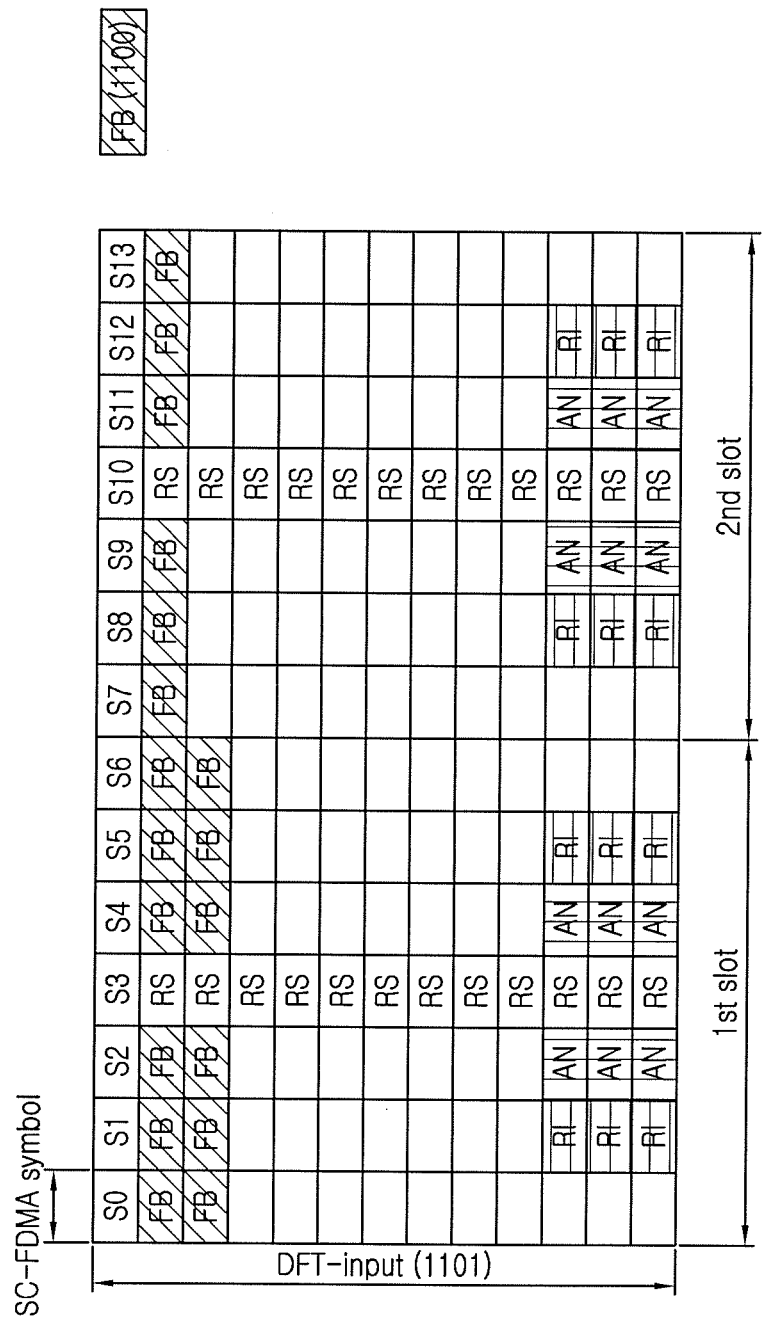
FIGS. 11 and 12 are views illustrating an example of a structure for transmitting feedback information using a data channel in a wireless communication system of a closed loop structure according to another embodiment of the present invention.
Figure 12:
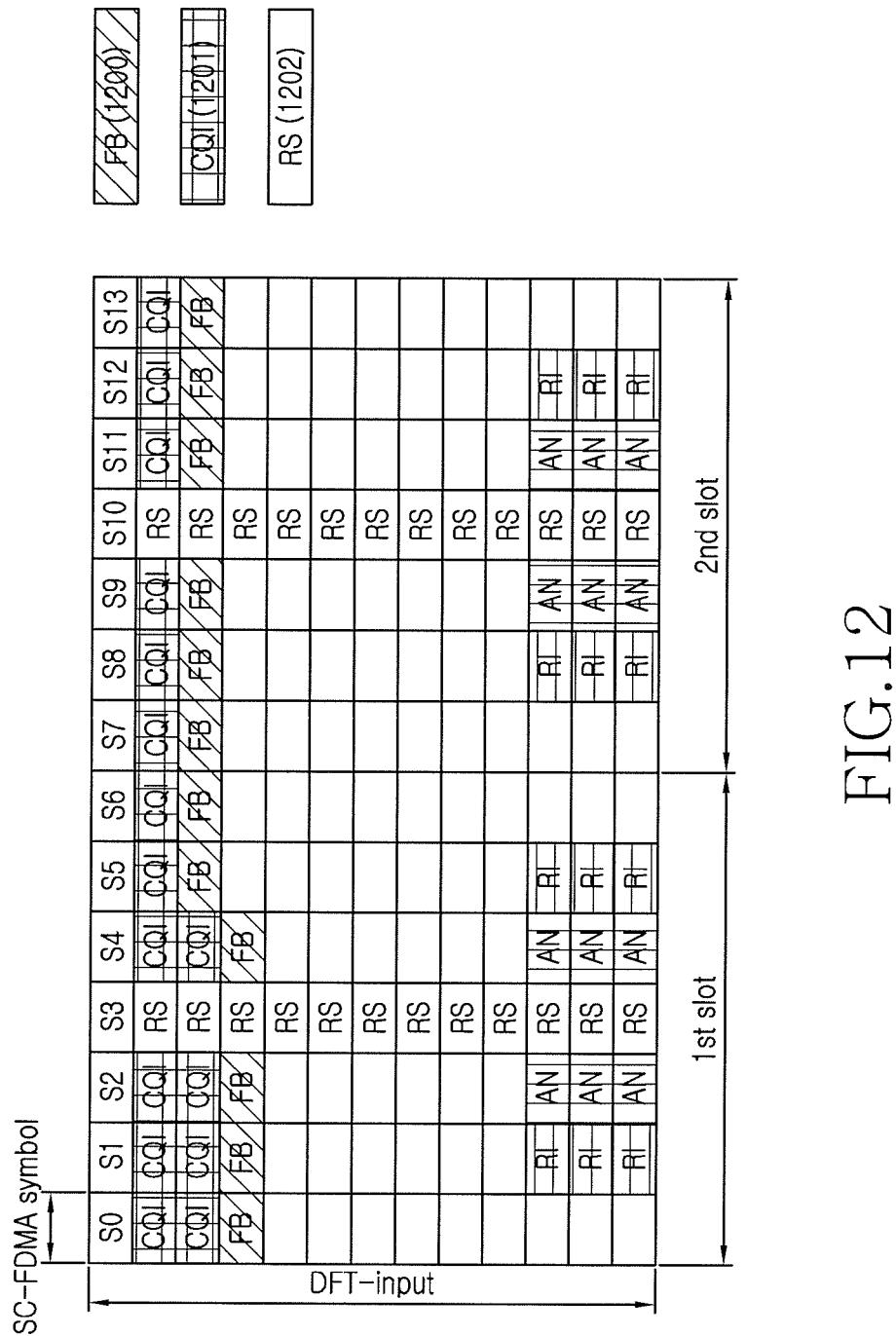

Also, the controller 1050 controls and processes a function for feeding back generated feedback information to the base station via a PUSCH or PUCCH. That is, since the base station transmits a PHICH to the terminal in order to represent whether the base station has properly received uplink data transmitted by the terminal, the controller 1050 may control and process a function for transmitting feedback information via a PUSCH that transmits user data. For example, as illustrated in FIG. 11, the controller 1050 may process such that feedback information 1100 in a PUSCH Discrete Fourier Transform (DFT) input 1101 is channel-encoded and then inserted and transmitted. At this point, since the user data may be rate-matched with consideration of an amount of relevant feedback information, a problem due to feedback information insertion will not occur. For another example, as illustrated in FIG. 12, the controller 1050 may process such that feedback information 1202 is channel-encoded and inserted at a position after a position where Channel Quality Information (CQI) information 1201 is inserted in the PUSCH DFT input 1101, and transmitted. Also, the controller 1050 may also process such that the CQI information and the feedback information are joint-coded together and inserted. Also, besides the methods of FIGS. 11 and 12, the controller 1050 allows the base station to obtain a high channel estimation accuracy when receiving feedback information by allowing feedback information to be inserted to a position adjacent to an RS within a PUSCH.

Figure 13:
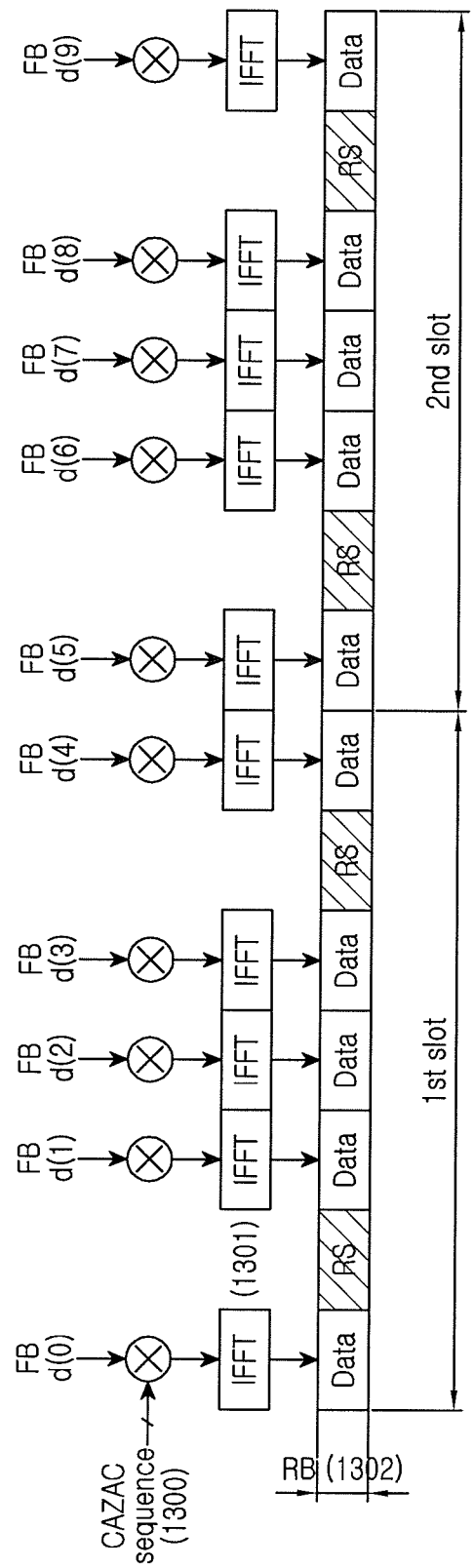
FIGS. 13 and 14 are views illustrating an example of a structure for transmitting feedback information using a control channel in a wireless communication system of a closed loop structure according to another embodiment of the present invention.

Also, the controller 1050 may control and process a function for transmitting feedback information via a PUCCH that transmits control information. At this point, the controller 1050 may multiplex feedback information via various formats of a control channel to perform a transmission process. For example, as illustrated in FIG. 13, the controller 1050 controls and processes a function for transmitting feedback information using a CQI transmission format among conventionally provided formats of a control channel. That is, as illustrated in FIG. 13, the controller 1050 controls and processes a function for encoding feedback information to modulate the same as ten QPSK symbols d(0), d(1), ... , d(9) at the maximum, then multiplying each symbol by a Constant Amplitude Zero Autocorrelation (CAZAC) sequence 1300, performing an IFFT operation 1301 on 12 extended symbols, and mapping the same to 12 subcarriers, that is, one PRB 1302 and transmitting the same. At this point, the controller 1050 processes d(0), d(1), ... , d(9) corresponding to respective QPSK symbols sequentially and controls to sequentially transmit them via an SC-FDMA symbol section for data transmission within the same PRB. Here, since a cyclic shift value of the CAZAC sequence multiplied to a transmission symbol is allocated differently for each terminal, even when a signal for a plurality of terminals is transmitted within one PRB, the base station may multiply a CAZAC sequence of a cyclic shift value allocated to each terminal to detect relevant information. Here, the method for transmitting feedback information is the same as a method of a PUCCH format 2 transmitting CQI information as well known in the conventional art.

Figure 14:
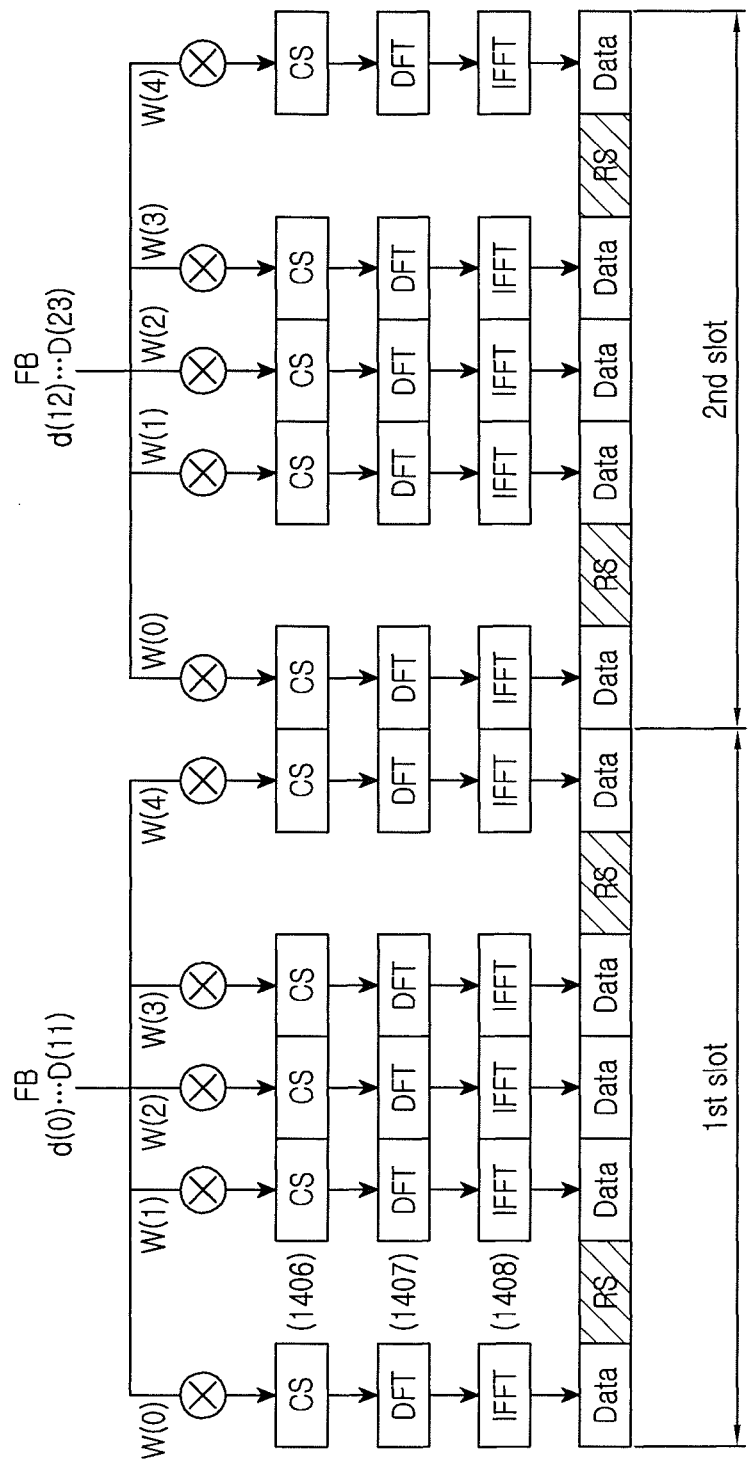

For another example, as illustrated in FIG. 14, the controller 1050 controls and processes a function for transmitting feedback information using an ACK/NACK transmission format among formats of the conventionally provided control channel. Since the ACK/NACK transmission format may transmit information corresponding to 48 bits at the maximum, the ACK/NACK transmission format is advantageous in transmitting a large amount of feedback information compared to a CQI format. As illustrated in FIG. 14, the controller 1050 controls and processes a function for encoding feedback information to modulate the same as twenty four QPSK symbols d(0), d(1), ... , d(23), dividing them into two groups, and then multiplying an orthogonal code {w(0), w(1), w(2), w(3), w(4)} having a length of 5 for each group, multiplying each symbol by a CAZAC sequence 1406, and sequentially transmitting the same via an SC-FDMA symbol for data transmission within one PRB by way of DFT 1407 and IFFT 1408. Here, the method for transmitting feedback is the same as a method of a PUCCH format 3 transmitting ACK/NACK information as well known in the conventional art.

The CP remover 1000 removes a CP from a signal received from an antenna, and outputs a CP-removed signal to the FFT unit 1010. The FFT 1010 performs an FFT operation on the signal output from the CP remover 1000 to output the same to the channel estimator 1020. The channel estimator 1020 estimates a channel from an RS of a PHICH PRB from the signal output from the FFT 1010, and outputs the estimated channel information to the channel compensator 1030 under control of the controller 1050. The channel compensator 1030 performs channel compensation on a reception signal using the estimated channel information, and outputs a channel-compensated signal to the PHICH decoder 1040. The PHICH decoder 1040 performs a function for decoding a channel-compensated signal to detect ACK/NACK information.

Meanwhile, the feedback information insert unit 1060 inserts feedback information to a PUSCH as illustrated in FIGS. 11 and 12, or inserts feedback information to a PUCCH as illustrated in FIGS. 13 and 14. Here, the feedback information may be convolution-encoded or block-encoded and then inserted to a PUSCH or a PUCCH. At this point, the encoding process may be performed on each feedback information for each PHICH PRB, and may be performed on entire feedback information.

The frequency allocator 1070 allocates a frequency and outputs the same with respect to a PUSCH or a PUCCH including feedback information, the IFFT unit 1080 performs an IFFT operation on a PUSCH or PUCCH signal including feedback information, and the CP insert unit 1090 inserts a CP to a relevant signal to transmit the same to the base station via the antenna.

As described above, assuming that frequency selectivity for a channel between the base station and the terminal is low in a closed loop system having the structure of FIGS. 7 and 10 and channel responses for all available frequency bands are the same, a reception signal of the terminal may be represented by Equation (1) and Equation (2) depending on beamforming of the base station. At this point, a channel response $|h_0+h_1w_0|^2$ of Equation (2) may be expressed by Equation (3) by setting beamforming weights $w_0$, $w_1$, $w_2$ of the base station to phase difference values between two antenna channels. At this point, another channel response of Equation (2) may be also expressed by Equation (3) below.

$$|h_0 + h_1 w_0|^2 = (|h_0|e^{j\theta_0} + |h_1|e^{j\theta_1} e^{j\phi_0}) \cdot (|h_0|e^{j\theta_0} + |h_1|e^{j\theta_1} e^{j\phi_0})^* \quad (3)$$

$$= |h_0|^2 + |h_1|^2 + 2|h_0||h_1|\cos(\theta_0 - \theta_1 - \phi_0)$$

$$= |h_0|^2 + |h_1|^2 + 2||h_0||h_1|$$

where $|h_0|$ and $|h_1|$ are frequency channel response sizes for the terminal from the first antenna and the second antenna, $\theta_0$ and $\theta_1$ are the phases of a signal for the terminal from the first antenna and the second antenna, and $\phi_0$ is a phase difference between $\theta_0$ and $\theta_1$. At this point, the size of $w_0$ is 1 and the phase of $w_0$ is represented by a phase difference $\phi_0$ between the two antenna channels. That is, the present invention may obtain a diversity gain by setting weight based on the phase difference $\phi_0$ between the two antenna channels as in Equation (3) and allowing cos value to become 1, and simultaneously, may obtain a coherent combining gain by compensating for the phase difference between the two antennas.

Meanwhile, assuming application of a beamforming technique with consideration of a phase difference between antenna channels under an environment where frequency selectivity is high for a channel between a base station and a terminal in the above-described closed loop system, a reception signal of the terminal may be expressed by Equation (4) below.

$$y_0 = h_{00}s + h_{10}w_0 s + n_0$$

$$y_1 = h_{01}s + h_{11}w_1s + n_1$$

$$y_2 = h_{02}s + h_{12}w_2s + n_2 \quad (4)$$

where $y_0$, $y_1$, $y_2$ are reception signals of a terminal in the frequency domain for PHICH PRBs 0, 1, 2, and $h_{(i-1)j}$ is a frequency channel response corresponding to PHICH RB j of an i-th antenna. For example, frequency channel responses for PHICH RBs 0, 1, 2 of the first antenna may be represented by $h_{00}$, $h_{01}$, $h_{02}$, respectively. Also, s represents a PHICH symbol inside a PHICH PRB, and $n_0$, $n_1$, $n_2$ represent noises for PHICH PRBs 0, 1, 2, respectively. Also, $w_0$, $w_1$, $w_2$ represent weights applied to PHICH PRBs 0, 1, 2 to be transmitted via each transmission antenna of the base station, that is, the second antenna 760-2.

Accordingly, a reception signal y of the terminal may be represented by Equation (5) below. That is, when channel compensation is performed on reception signals $y_0$, $y_1$, $y_2$ for respective PHICH PRBs 0, 1, 2 as expressed by Equation (4) and then they are combined, they may be expressed by Equation (5).

$$\begin{aligned} y &= (h_{00} + h_{10}w_0)^* y_0 + (h_{01} + h_{11}w_1)^* y_1 + (h_{02} + h_{12}w_2)^* y_2 \quad (5) \\ &= \{|h_{00}|^2 + |h_{10}|^2 + 2|h_{00}||h_{10}|\cos(\theta_{00} - \theta_{10} - \phi_0) + |h_{01}|^2 + |h_{11}|^2 + \\ &\quad 2|h_{01}||h_{14}|\cos(\theta_{01} - \theta_{11} - \phi_1) + |h_{02}|^2 + |h_{12}|^2 + 2|h_{02}||h_{12}| \\ &\quad \cos(\theta_{02} - \theta_{12} - \phi_2)\} \cdot s + n \\ &= \{|h_{00}|^2 + |h_{10}|^2 + 2|h_{00}||h_{10}| + |h_{01}|^2 + |h_{11}|^2 + 2|h_{01}||h_{14}| + \\ &\quad |h_{02}|^2 + |h_{12}|^2 + 2|h_{02}||h_{12}|\} \cdot s + n \end{aligned}$$

where $\theta_{(i-1)j}$ is a phase difference of a frequency channel response corresponding to a PHICH PRB j received via an i-th antenna, and $\theta_0$, $\theta_1$, $\theta_2$ are weight values applied to PHICH PRBs 0, 1, 2. At this point, $\theta_0$, $\theta_1$, $\theta_2$ are set to $\theta_{00}-\theta_{10}$, $\theta_{01}-\theta_{11}$, $\theta_{02}-\theta_{12}$. That is, since the present invention may obtain a frequency diversity gain from different frequency channel responses for each PHICH PRB simultaneously in addition to an antenna diversity gain and a synchronization combination gain as expressed by Equation (4), the present invention may improve a reception performance of a PHICH.

Figure 15:
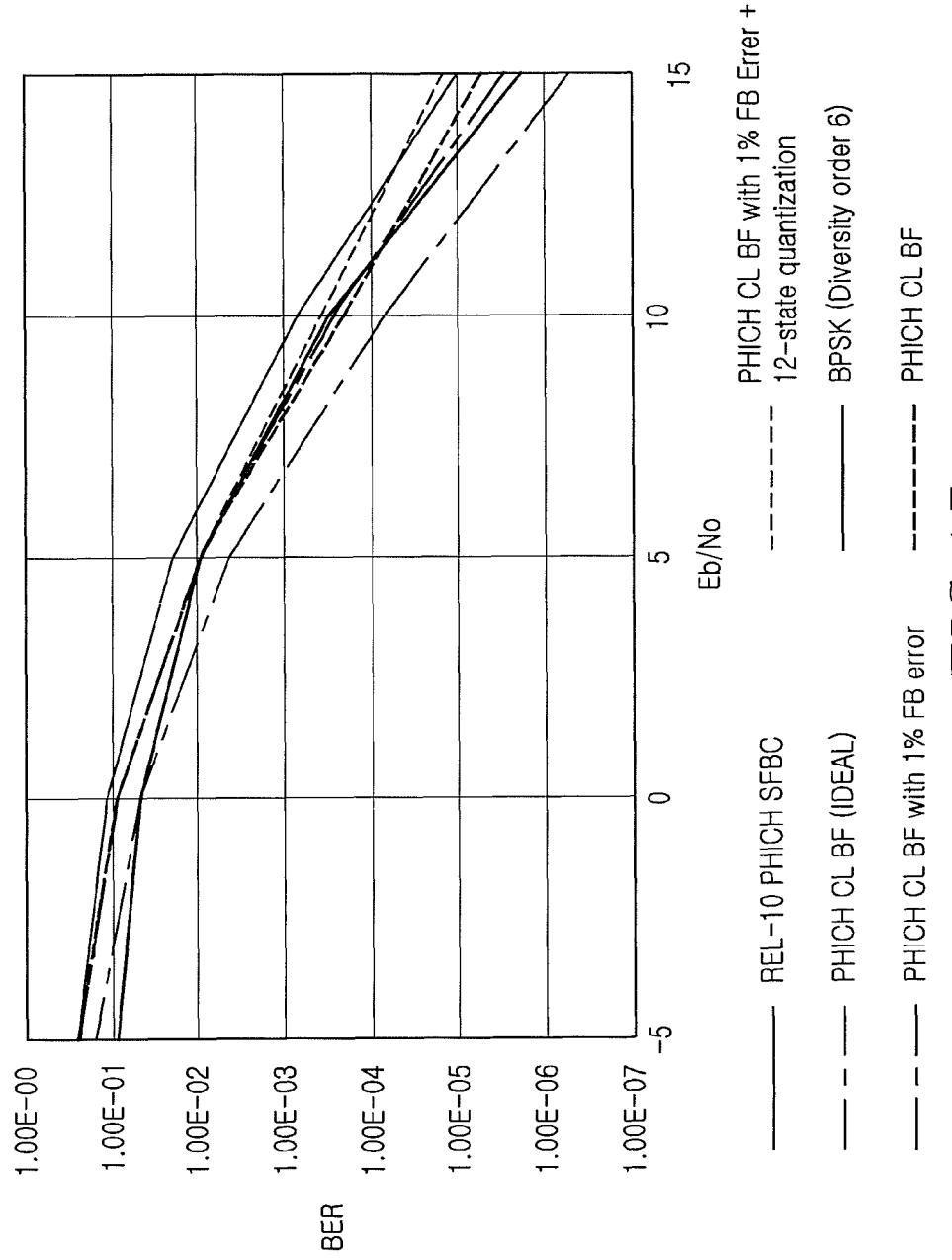
FIG. 15 is a view illustrating a PHICH transmission performance graph of a wireless communication system of a closed loop structure according to a conventional art and another embodiment of the present invention.

FIG. 15 illustrates a PHICH transmission performance graph of a wireless communication system of a closed loop structure according to a conventional art and another embodiment of the present invention. Here, it is assumed that one PHICH is transmitted to a PHICH PRB in a channel bandwidth of 10 MHz under a situation where the number of transmission antennas of a base station is 2 and the number of reception antennas of a terminal is 1. At this point, it is assumed that the moving velocity of the terminal is a low speed of 1 km/h, and a Typical Urban (TU) 6 model has been applied as a fading channel.

In FIG. 15, Rel-10 PHICH SFBC represents Bit Error Rate (BER) performance for a PHICH transmission technique that uses an open loop transmission diversity scheme defined by the current LTE/LTE-A standard, and BPSK (Diversity order 6) represents theoretical BER performance of the BPSK scheme in case of obtaining a diversity sixth order gain under a fading channel environment. In a TU6 channel model where frequency selectivity exists, Rel-PHICH SFBC obtains second order antenna diversity from two transmission antennas and obtains third order frequency diversity from three PHICH PRBs, so that it may obtain sixth order diversity theoretically, but when an actual channel estimation error is considered, Rel-10 PHICH SFBC has performance deterioration of about 1.5 dB at $10^{-3}$ BER compared to a theoretical value of BPSK (Diversity order 6).

Also, PHICH CL BF (IDEAL) represents BER performance for a case where a channel estimation error does not exist in the closed loop beamforming method of the present invention. In this case, since a sixth order diversity gain may be obtained and simultaneously an antenna synchronization combination gain may be obtained, performance that is excellent by about 1.5 dB or more at $10^{-3}$ BER is achieved compared to a BPSK (Diversity order 6) theoretical value.

In contrast, PHICH CL BF represents BER performance for a case where a channel estimation error exists in the closed loop beamforming scheme of the present invention. In this case, despite existence of a channel estimation error, performance almost similar to BPSK (Diversity order 6) is shown, and performance that is excellent by about 1 dB at $10^{-3}$ BER is achieved compared to Rel-10 PHICH SFBC.

Also, a PHICH CL BF with 1% FB error represents not only a channel estimation error in the closed loop beamforming scheme of the present invention but also BER performance of a situation where a feedback information error of 1% probability exists, and shows performance improved by about 1 dB at $10^{-3}$ BER compared to Rel-10 PHICH SFBC.

Additionally, a PHICH CL BF with 1% FB error+12-state quantization represents performance in case of quantizing feedback information to 12 levels and adding a quantization error besides a channel estimation error and a feedback error, and shows performance that is excellent by about 1 dB at $10^{-3}$ BER compared to Rel-10 PHICH SFBC. Of course, a phenomenon that a relative performance gain reduces in a very high Energy per Bit to Noise power spectral density ratio (Eb/No) region due to a limitation by a feedback error and a quantization error, but when it is considered that this degree of Eb/No is not a practical numerical value in an actual communication environment, performance improvement via a quantization level increase of feedback may be possible.

Figure 16:
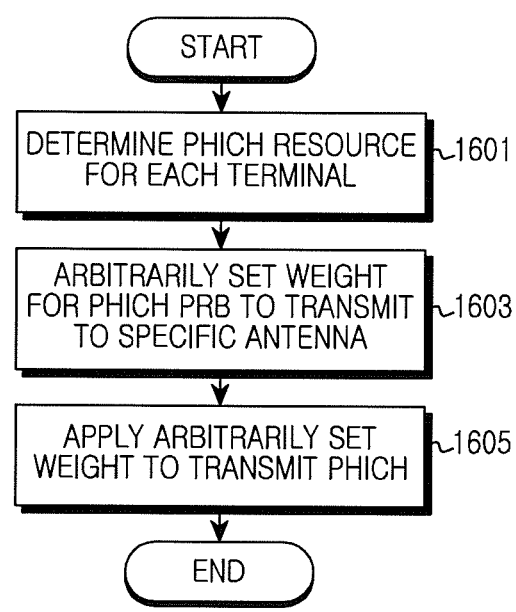
FIG. 16 is a flowchart illustrating a procedure for transmitting, at a base station, a PHICH in a wireless communication system of an open loop structure according to an embodiment of the present invention.

FIG. 16 illustrates a procedure for transmitting, at a base station, a PHICH in a wireless communication system of an open loop structure according to an embodiment of the present invention. Here, it is assumed that the base station has set a PRB set to use for PHICH transmission, that is, PHICH PRBs in advance (210), and transmitted setting information regarding the PHICH PRBs determined in advance to a terminal via RRC signaling or other signalings (212).

Referring to FIG. 16, the base station determines a PHICH resource for each terminal in step 1601.

After that, the base station arbitrarily sets weight of a PHICH PRB to transmit to a specific antenna in step 1603, and applies the arbitrarily set weight to an RS and ACK/NACK information and then transmits the same via a determined PHICH resource determined in step 1601 in step 1605. That is, the base station repeatedly generates a PHICH signal to transmit to each terminal by the number of times set in advance, and maps the repeatedly generated PHICH signal to a PHICH PRB determined in advance to transmit the same via a plurality of antennas. At this point, the base station may obtain a diversity gain by applying arbitrary weight to a PHICH PRB to be transmitted via a specific antenna among a plurality of antennas.

After that, the base station ends the algorithm according to the present invention.

Figure 17:
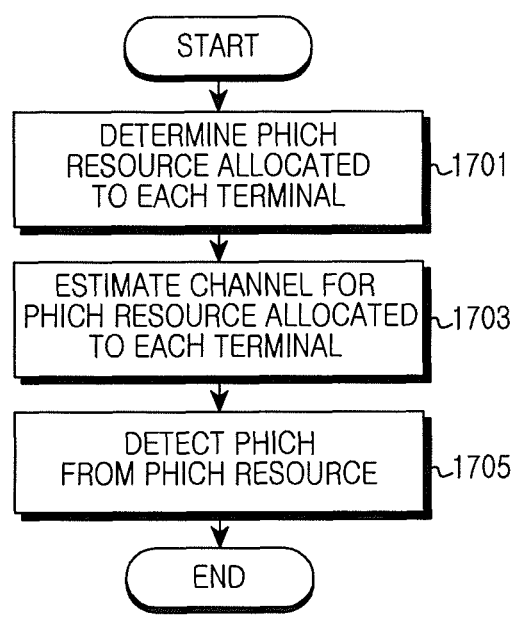
FIG. 17 is a flowchart illustrating a procedure for receiving, at a terminal, a PHICH in a wireless communication system of an open loop structure according to an embodiment of the present invention.

FIG. 17 illustrates a procedure for receiving, at a terminal, a PHICH in a wireless communication system of an open loop structure according to an embodiment of the present invention. Here, it is assumed that the terminal has obtained (214) a PHICH set used for PHICH transmission, that is, information regarding PHICH PRBs via RRC signaling or other signalings from a base station.

Referring to FIG. 17, the terminal determines a PHICH resource allocated to each terminal based on information regarding a PHICH PRB received in advance via RRC signaling or other signalings from the base station in step 1701.

After that, the terminal estimates a channel for a PHICH resource allocated to each terminal in step 703, and proceeds to step 705 to detect a PHICH from the PHICH resource using the estimated channel.

After that, the terminal ends the algorithm according to the present invention.

Figure 18:
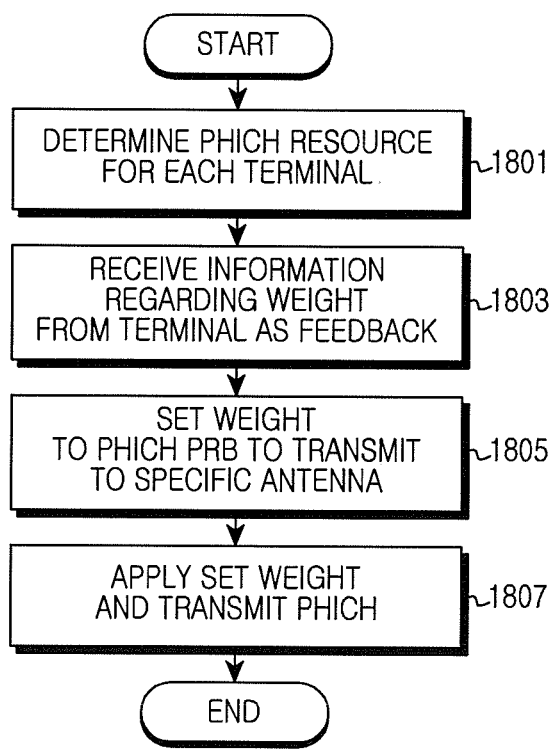
FIG. 18 is a flowchart illustrating a procedure for transmitting, at a base station, a PHICH in a wireless communication system of a closed loop structure according to another embodiment of the present invention.

FIG. 18 illustrates a procedure for transmitting, at a base station, a PHICH in a wireless communication system of a closed loop structure according to another embodiment of the present invention. Here, it is assumed that the base station has set a PRB set to use for PHICH transmission, that is, PHICH PRBs in advance (210), and transmitted setting information regarding PHICH PRBs determined in advance to a terminal via RRC signaling or other signalings.

Referring to FIG. 18, the base station determines a PHICH resource for each terminal in step 1801.

After that, the base station receives information regarding weight, that is, information representing a phase difference between antenna channels from a terminal as feedback in step 1803. Here, the information representing the phase difference between the antenna channels may be fed back via a PUSCH or a PUCCH. Also, the information fed back from the terminal may be phase difference information for each PHICH PRB between transmission antenna channels of the base station, information representing a difference value regarding a previous phase difference for each PHICH PRB, phase information of a PHICH PRB for each transmission antenna, or information regarding a phase or a size. That is, the feedback information includes all information that may obtain weight for each PHICH PRB between transmission antenna channels.

After that, the base station sets weight regarding a PHICH PRB that is to transmit a phase difference between antenna channels to a specific antenna in step 1805, and applies weight set to the phase difference between the antenna channels to ACK/NACK information and transmits the same via the PHICH resource determined in step 1801 in step 1807. That is, the base station repeatedly generates a PHICH signal to transmit to each terminal by the number of times set in advance, and maps the repeatedly generated PHICH signal to a PHICH PRB determined in advance to transmit the same via a plurality of antennas. At this point, the base station may obtain a diversity gain by applying arbitrary weight that considers a phase difference between antenna channels to a PHICH PRB to be transmitted via a specific antenna among a plurality of antennas.

After that, the base station ends the algorithm according to the present invention.

Figure 19:
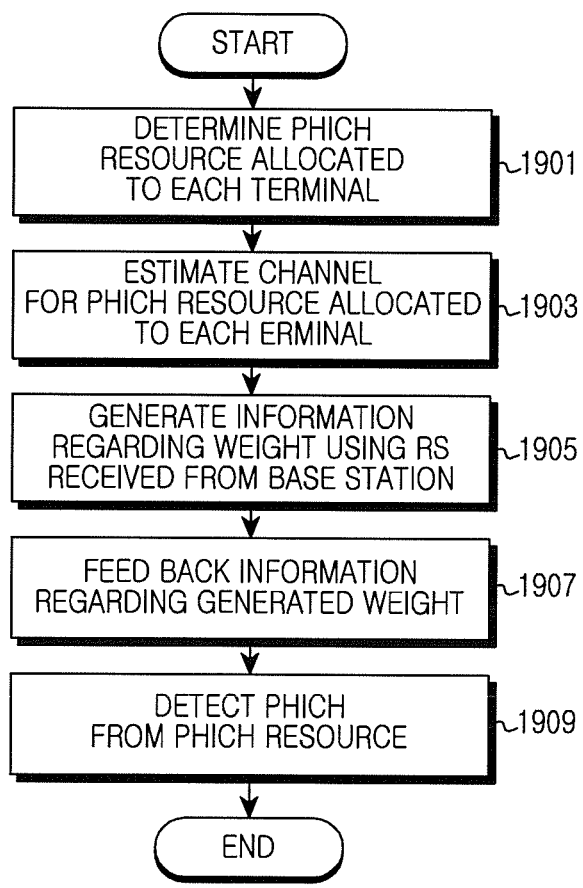
FIG. 19 is a flowchart illustrating a procedure for receiving, at a terminal, a PHICH in a wireless communication system of a closed loop structure according to another embodiment of the present invention.

Referring to FIG. 19, the terminal determines a PHICH resource allocated to each terminal based on information regarding a PHICH PRB received in advance via RRC signaling or other signalings from the base station in step 1901.

After that, the terminal estimates a channel with respect to a PHICH resource allocated to each terminal in step 1903, and generates information regarding weight using an RS received from the base station in step 1905. That is, the terminal calculates a phase difference between two antenna channels of the base station, and generates information representing the calculated phase difference. Here, the information representing the phase difference may be phase difference information for each PHICH PRB between transmission antenna channels of the base station, information representing a difference value regarding a previous phase difference for each PHICH PRB, phase information of a PHICH PRB for each transmission antenna, or information regarding a phase or a size. That is, the feedback information includes all information that may obtain weight for each PHICH PRB between transmission antenna channels of the base station.

After that, the terminal feeds back information regarding weight to the base station in step 1907. Here, the terminal may feed back information regarding weight to the base station via a PUSCH or a PUCCH.

After that, the terminal proceeds to step 1909 to detect a PHICH from a PHICH resource using an estimated channel. After that, the terminal ends the algorithm according to the present invention.

According to the present invention, in a wireless communication system supporting an HARQ technique, a base station determines a specific frequency region for a PHICH, and transmits a PHICH including ACK/NACK information via only the determined frequency region, so that the number of RSs required for detection of reception end ACK/NACK is reduced and so a resource efficiency is raised. Also, the base station may apply weight to each of PRBs allocated for a PHICH to obtain a diversity gain. Particularly, the base station has an effect of being able to transmit ACK/NACK information that considers a channel state by setting beamforming weight for each PRB with consideration of a phase difference between antenna channels. Lastly, the present invention provides a method for allowing the terminal to efficiently transmit the above-described beamforming related information to the base station, so that the ACK/NACK transmission may be properly performed depending on a channel state.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a base station (BS) in a wireless communication system, the method comprising:
  determining a number of acknowledge/negative-acknowledge (ACK/NACK) repetitions;
  identifying at least one physical resource block (PRB) for transmitting ACK/NACK information among a plurality of PRBs for an available frequency band based on the number of ACK/NACK repetitions;
  transmitting, to a terminal, a message for notifying the at least one PRB;
  generating ACK/NACK signals by modulating the ACK/NACK information; and
  transmitting the ACK/NACK signals and reference signals that are specified for transmitting the ACK/NACK signals using the at least one PRB, wherein a number of the identified at least one PRB for transmitting the ACK/NACK information corresponds to the number of ACK/NACK repetitions.

2. The method of claim 1, wherein transmitting the ACK/NACK signals comprises:
beamforming a first subset of the ACK/NACK signals by applying weights;
transmitting the first subset of the ACK/NACK signals via a first antenna; and
transmitting a second subset of the ACK/NACK signals via a second antenna.

3. The method of claim 2, wherein the weights are determined based on a phase difference between a channel of the first antenna and a channel of the second antenna.

4. The method of claim 2, further comprising:
receiving a feedback signal including information on the weights.

5. The method of claim 4, wherein the information on the weights is received via one of a data channel for transmitting uplink data and a control channel for transmitting uplink control data.

6. A method for operating a terminal in a wireless communication system, the method comprising:
receiving, from a base station (BS), a message for notifying at least one physical resource block (PRB), wherein the at least one PRB is identified by the BS for transmitting acknowledge/negative-acknowledge (ACK/NACK) information among a plurality of PRBs for an available frequency band based on a number of ACK/NACK repetitions that is determined by the BS; and
receiving ACK/NACK signals and reference signals that are specified for receiving the ACK/NACK signals using the identified at least one PRB,
wherein the ACK/NACK signals are generated by modulating the ACK/NACK information by the BS, and
wherein a number of the identified at least one PRB for transmitting the ACK/NACK information corresponds to the number of ACK/NACK repetitions.

7. The method of claim 6, further comprising:
transmitting a feedback signal including information on weights for beamforming the ACK/NACK signals to a base station.

8. The method of claim 7, wherein the information on the weights is transmitted via one of a data channel for transmitting uplink data and a control channel for transmitting uplink control data.

9. The method of claim 6, wherein the ACK/NACK signals comprise a first subset of the ACK/NACK signals transmitted via a first antenna, and transmitting a second subset of the ACK/NACK signals transmitted via a second antenna,
wherein the first subset of the ACK/NACK signals are beamformed based on weights by the BS.

10. The method of claim 9, wherein the weights on the ACK/NACK signals are determined based on a phase difference between a channel of the first antenna and a channel of the second antenna.

11. An apparatus for a base station in a wireless communication system, the apparatus comprising:
at least one processor configured to:
determine a number of acknowledge/negative-acknowledge (ACK/NACK) repetitions; and
identify at least one physical resource block (PRB) for transmitting ACK/NACK information among a plurality of PRBs for an available frequency band based on the number of ACK/NACK repetitions;
at least one transceiver configured to transmit, to a terminal, a message for notifying the at least one PRB;
wherein the at least one processor is configured to generate ACK/NACK signals by modulating the ACK/NACK information,
wherein the at least one transceiver is configured to transmit the ACK/NACK signals and reference signals that are specified for transmitting the ACK/NACK signals by using the identified at least one PRB, and
wherein a number of the identified at least one PRB for transmitting the ACK/NACK information corresponds to the number of ACK/NACK repetitions.

12. The apparatus of claim 11, wherein the at least one transceiver is further configured to beamform a first subset of the ACK/NACK signals by applying weights, to transmit the first subset of the ACK/NACK signals via a first antenna in the at least one transceiver, and to transmit a second subset of the ACK/NACK signals via a second antenna in the at least one transceiver.

13. The apparatus of claim 12, wherein the weights are determined based on a phase difference between a channel of the first antenna and a channel of the second antenna.

14. The apparatus of claim 12, wherein the at least one transceiver is further configured to receive a feedback signal including information on the weights.

15. The apparatus of claim 14, wherein the information on the weights is received via one of a data channel for transmitting uplink data and a control channel for transmitting uplink control data.

16. An apparatus for a terminal in a wireless communication system, the apparatus comprising:
at least one transceiver configured to:
receive, from a base station (BS), a message for notifying at least one physical resource block PRB, wherein the at least one PRB is identified by the BS for transmitting acknowledge/negative-acknowledge (ACK/NACK) information among a plurality of PRBs for an available frequency band based on a number of ACK/NACK repetitions that is determined by the BS; and
receive ACK/NACK signals and reference signals that are specified for receiving the ACK/NACK signals using the identified at least one PRB,
wherein the ACK/NACK signals are generated by modulating the ACK/NACK information, by the BS, and
wherein a number of the identified at least one PRB for transmitting the ACK/NACK information corresponds to the number of ACK/NACK repetitions.

17. The apparatus of claim 16, wherein the at least one transceiver is further configured to transmit a feedback signal including information on weights for beamforming the ACK/NACK signals to a base station.

18. The apparatus of claim 17, wherein the information on the weights is transmitted via one of a data channel for transmitting uplink data and a control channel for transmitting uplink control data.

19. The apparatus of claim 16, wherein the ACK/NACK signals comprise a first subset of the ACK/NACK signals transmitted via a first antenna in the at least one transceiver, and transmitting a second subset of the ACK/NACK signals transmitted via a second antenna in the at least one transceiver,
wherein the first subset of the ACK/NACK signals are beamformed based on weights by the BS.

20. The apparatus of claim 19, wherein the weights on the ACK/NACK signals are determined based on a phase difference between a channel of the first antenna and a channel of the second antenna.

* * * * *